(12) United States Patent
Fikes et al.

(10) Patent No.: US 7,779,103 B1
(45) Date of Patent: Aug. 17, 2010

(54) DUAL COOKIE SECURITY SYSTEM

(75) Inventors: Andrew B. Fikes, Los Altos, CA (US);
Michael Burrows, Palo Alto, CA (US);
Marius Schilder, Sunnyvale, CA (US);
Robert C. Pike, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 11/609,841

(22) Filed: Dec. 12, 2006

(51) Int. Cl.
*G06F 15/16* (2006.01)

(52) U.S. Cl. .............................. 709/223; 726/5; 726/10; 709/219; 709/227

(58) Field of Classification Search ......... 709/201–203, 709/217–219, 227–229; 726/2–10
See application file for complete search history.

(56) References Cited

U.S. PATENT DOCUMENTS

| | | | | |
|---|---|---|---|---|
| 6,047,268 | A | 4/2000 | Bartoli et al. | 705/35 |
| 6,986,047 | B2 | 1/2006 | Giles et al. | 713/175 |
| 7,082,532 | B1 | 7/2006 | Vick et al. | 713/155 |
| 2003/0149900 | A1 | 8/2003 | Glassman et al. | 713/202 |
| 2007/0124805 | A1* | 5/2007 | Zhou et al. | 726/5 |
| 2007/0299928 | A1* | 12/2007 | Kohli et al. | 709/217 |

FOREIGN PATENT DOCUMENTS

| | | | |
|---|---|---|---|
| KR | 10-2001-0049986 | * | 8/2001 |
| KR | 2003/0016073 | | 2/2003 |

OTHER PUBLICATIONS

Diament, T., et al. "The Dual Receiver Cryptosystem and Its Applications," ACM, Oct. 2004.

* cited by examiner

*Primary Examiner*—Joseph E Avellino
*Assistant Examiner*—Afshawn Towfighi
(74) *Attorney, Agent, or Firm*—Morgan, Lewis & Bockius LLP

(57) ABSTRACT

One or more servers receive requests from clients and send responses. At least a subset of the responses including cookies produced by the one or more servers, and at least a subset of the received requests including cookies that were previously produced by the one or more servers and sent to the clients with responses to previously processed requests. Each of the cookies includes a respective user identifier. The one or more servers analyzing the received cookies to detect a first condition, which indicates that a respective plurality of clients may be using cookies that have a shared user identifier. Upon detecting the first condition, the one or more servers send at least one of the clients of the respective plurality of clients a response that includes a new cookie having a user identifier that is distinct from the shared user identifier.

14 Claims, 15 Drawing Sheets

At one or more servers associated with a first domain: receive first requests from clients and send first responses to the clients. At least some of the first requests include first cookies sent to clients with previous responses. 902

At a server associated with a subdomain of the first domain: receive second requests from clients and send second responses to the clients. At least a subset of the second requests include second cookies. 904

Analyze the received second requests to detect a first condition, which indicates that a respective client is using a respective first cookie that belongs to a second client. 906

First condition detected

Perform remedial action (e.g., send response to a respective second request from a respective client, so as to cause the respective first cookie to be deleted from the respective client). 908

Figure 9

DUAL COOKIE SECURITY SYSTEM

CROSS REFERENCE TO RELATED APPLICATIONS

This application is related to U.S. patent application Ser. No. 11/609,847, filed Dec. 12, 2006, titled "Dual Cookie Security System with Interlocking Validation Requirements and Remedial Actions to Protect Personal Date," which application is incorporated herein by reference.

This application is also related to U.S. patent application Ser. No. 11/609,850, filed Dec. 12, 2006, titled "Cookie Security System with Interloper Detection and Remedial Actions to Protect Personal Data," which application is incorporated herein by reference.

FIELD OF THE INVENTION

The present invention relates generally to the field of client-server computer network systems, and in particular, to systems and methods for enhancing cookie security in client-server computer network systems.

BACKGROUND OF THE INVENTION

People access more and more information including services through the Internet. On many occasions a user is required to provide certain information to be served or better served by an information source (e.g., a website). Some of the information may be related to the user personally. For purposes of this discussion, personal information is divided into three categories, low-sensitivity, mid-sensitivity, and high-sensitivity, depending on the information's proximity to the user's privacy. While the number of sensitivity levels and the boundary lines between sensitivity levels is somewhat arbitrary, the aforementioned three-level division will be useful for the following discussion. In addition, for the purposes of this discussion, the terms "make public" or "made public" include disclosing information, accidentally or otherwise, to even one person who does not have explicit permission to receive that information.

Low-sensitivity personal information is one that, albeit personal, rarely requires any protection from being made public. For example, a user may specify a language as his preferred one at a multi-lingual website such that the website automatically renders web pages in the user's preferred language. Since it is fairly easy to learn what language a person prefers to use, few people, if any, would be concerned about such information being made public (e.g., disclosed to another user of the same information service).

In contrast, high-sensitivity personal information is germane to a person's privacy and always requires security measures to protect against infiltration by others. For instance, a user's email account often includes email messages highly private to the user and/or those who exchange messages with him. Access to the messages usually requires an express login with a correct combination of username and password. For example, upon receipt of the username and password from a client computer, a service provider (e.g., an email server) generates a unique object such as a cookie for authenticating the user. The cookie is a small piece of data that is sent back to and stored at the client computer. The service provider allows a request to access the user's email account from the client computer if the request includes the cookie.

Between the low-sensitivity and high-sensitivity types of personal information is mid-sensitivity personal information, which is more critical to a person's privacy than the low-sensitivity one, but less than the high-sensitivity one. User-submitted query terms to a search engine, i.e., a user's search history, are an example of mid-sensitivity personal information. An investigation of these query terms can easily reveal the kind's of information that interests a user, and which many or most users would not want to be made public. For example, if the user submits a series of query terms associated with a particular type of disease, it is possible that he may (or he suspects that he may) have this disease. Although a user would like to keep this type of personal information private, the login approach to protecting this information may be excessively burdensome, because it would prevent casual users from using search engines and other online services unless they became registered users with user names and passwords.

Based on the above discussion, another potential definition for mid-sensitivity personal information is personal information that is routinely submitted by users to online services without first establishing a login relationship (i.e., requiring a username and password) with those online services. Thus, in some instances, the mid-sensitivity personal information may be just as confidential or personal as the high-sensitivity information, but for various reasons many users have routinely submitted such information to online services (e.g., merchants, search engines, and other information sources) without first establishing that such information will in fact be protected and kept private.

Therefore, there is a need for a convenient approach for protecting a user's mid-sensitivity personal information from being made public or being illegally obtained.

SUMMARY OF DISCLOSED EMBODIMENTS

According to a first aspect of the present invention, one or more servers receive requests from clients and send responses back to the clients. A subset of the requests include cryptographically protected objects that were previously produced by the servers and sent back to the clients with responses to previously processed requests, each object including a respective user identifier. The servers analyze the received objects to detect a first condition indicating that at least two clients may be using objects having a shared user identifier (i.e., a potential error condition or privacy breach has been detected). Upon detecting the first condition, the servers send at least one of the clients a response that includes a new cryptographically protected object having a user identifier that is distinct from the shared user identifier.

According to a second aspect of the present invention, one or more servers receive requests from clients and send responses back to the clients. A subset of the requests include cryptographically protected objects that were previously produced by the servers and sent back to the clients with responses to previously processed requests, each object including a respective user identifier. The servers analyze the received objects to detect a second condition indicating that a respective client has repeatedly failed to replace an old object with a new object sent by the servers to the client. Upon detecting the second condition, the servers perform pre-defined remedial actions including providing services to the respective client using a generic object (i.e., sending to the client a response that is independent of the respective user identifier in the object that was included with the client's request) and performing one or more actions for removing (i.e., attempting to remove) the old object from the respective client's memory.

According to a third aspect of the present invention, a first server associated with a domain receives first requests from clients and sends first responses to the clients. A subset of the first requests include first objects that were previously sent to the clients with responses to previously processed first requests, each object including a respective user identifier. A second server associated with a sub-domain of the domain receives second requests from the clients and sends second responses to the clients. At least a subset of the second requests includes second objects.

The first and second servers analyze the first requests to detect a third condition indicating that a first client is using a respective first object that belongs to a second client. Upon detecting the third condition, the first and second servers perform first predefined remedial actions including providing services to the first client using a generic object and requesting the first client to submit a second request to the second server for further examination. The second server analyzes the second request to detect a fourth condition indicating that the first client has failed to provide a respective second object that belongs to the second client. Upon detecting the fourth condition, the second server performs second predefined remedial actions, including disabling a respective user identifier associated with the second client and returning to the first respective client a first object and second object that include a new (e.g., previously unassigned or unused) user identifier.

According to a fourth aspect of the present invention, a first server associated with a first URL receives a request from a client, the request including a first object associated with a respective user identifier. The first server evaluates the first object with respect to a first validation requirement. If the first object fails the first validation requirement, the first server sends a response to the client that causes the client to send a second request to a second URL. For example, the response may include an executable reference to the second URL. Examples of executable references include an object link to the second URL, and an executable reference script (e.g., a javascript script) that accesses the second URL.

A second server associated with the second URL receives a request from the client that includes a second object. The second server evaluates the second object with respect to a second validation requirement. If the second object fails the second validation requirement, the second server invalidates the respective user identifier and performs an action to remove the first and second objects from the client. For example, and without limitation, the action performed may include sending expired replacement objects to the client, which, if the client's browser application is operating properly, will result in deletion of the first and second objects. The first object and second object may be cryptographically protected object.

According to a fifth aspect of the present invention, a client sends a first request to a first server associated with a first domain, the request including a first object and receives a response to the first request. If the response includes an executable reference to a second server associated with a sub-domain of the first domain, the client sends a second request to the second server and receives a response to the second request. The second request includes a first object and a second object and the response to the second request includes an updated version of the first and second objects. The first and second objects may be cryptographically protected object.

According to a sixth aspect of the present invention, a server receives a request from a client, the request including an object that includes a respective user identifier and validation value. If the respective user identifier is valid, the validation value fails a first requirement in a predefined manner, and a count of consecutively received objects whose validation value has failed the first validation requirement is less than a threshold value that is greater than one, the server performs a first set of operations, including returning to the client a response in accordance with the respective user identifier, the response including an updated object that includes the respective user identifier and an updated validation value.

If the respective user identifier is valid, the validation value fails the first requirement in the predefined manner, and the count of consecutively received objects whose validation value has failed the first validation requirement is equal to or exceeds the threshold value, the server performs a second set of operations, including initiating a predefined remedial action.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

FIG. 9 is a flowchart illustrating how the cookie server analyzes a second cookie received from a client according to some embodiments of the invention.

DESCRIPTION OF EMBODIMENTS

Figure 1:
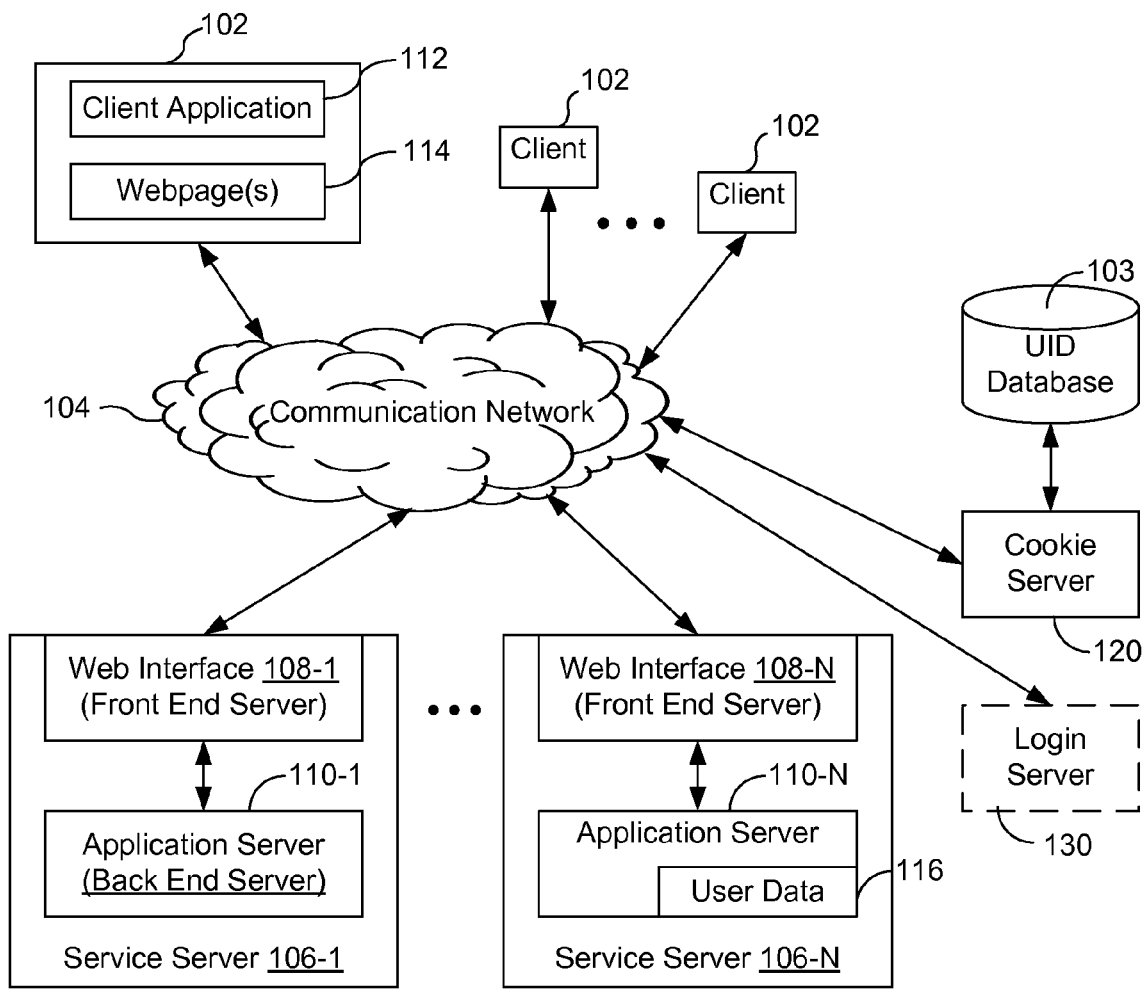
FIG. 1 is a block diagram illustrating the infrastructure of a client-server distributed system according to some embodiments of the invention.

FIG. 1 is a block diagram illustrating the infrastructure of a client-server distributed system according to some embodiments of the invention. The distributed system includes a plurality of clients 102, a plurality of service servers 106, one or more cookie servers 120, and one or more optional login servers 130. These components are linked together through one or more communication networks 104 (e.g., the Internet) so that the various components can communicate with each other. In some embodiments, the service servers 106, the cookie server 120, and the optional login server 130 are connected to each other through a local area network (LAN) and exchange information with the clients 102 through a common interface (e.g., one or more web servers).

A client 102 includes a client application 112 (e.g., a web browser). A user can use the web browser to download one or more webpages 114 from the service servers 106. The client 102 (sometimes herein called the "client device" or "client computer") may be any computer or similar device that is capable of receiving webpages from and sending requests (e.g., webpage requests, search queries, information requests, login requests, etc.) to the service server 106 and the cookie server 120. Examples of client devices include, without limitation, desktop computers, notebook computers, tablet computers, mobile devices such as mobile phones and personal digital assistants, and set-top boxes. In the present application, the term "webpage" means virtually any document or content of any format including, but not limited to, text, image, audio, video, etc., that may be used by a web browser or other client application programs.

A service server 106 includes at least a web interface 108 and an application server 110. The web interface 108 parses requests from the clients 102, fetches corresponding webpages from the application server 110 and returns the webpages to the requesting clients 102. Depending upon their respective locations in the topology of the client-server system, the web interface 108 and the application server 110 are also referred to as a "front end server" and a "back end server" in some embodiments. In the present application, the terms "web interface" and "front end server" are used interchangeably. In some other embodiments, the front end server 108 and the back end server 110 are merged into one software application or one server.

In some embodiments, the service servers 106 are deployed over multiple computers (represented by N computers in FIG. 1) as to provide different types of services such as search engine services, email services, map services, and the like. The number of computers or servers 106 may be an integer greater than 1, e.g., an integer between 2 and 16,384. In some other embodiments, one individual type of service may also be distributed among multiple computer servers. For example, consider a system in which service server 106-N is a search engine. The user data 116 (e.g., user profiles and/or search history for multiple users) stored by the service server 106-N may be stored in multiple application servers 110-N or multiple data storage devices accessible to the application server 110-N.

Upon receipt of a new search request including one or more query terms, the front end server 108-N parses the search request, submits the query terms to the application server 110-N, and then waits for the application server 110-N to return a search result. The application server 110-N queries its database for webpages most relevant to the query terms and returns a search result including links to the most relevant webpages to the front end server 108-N, which then forwards the search result to the requesting client 102.

To provide better service, the application server 110-N may personalize a search result using a user's profile, search history and/or other personal information stored in the user data 116-N. Since the service server 106-N provides search engine service to a large number of users, it must associate each user's search profile, search history or the like with a unique user identifier to provide personalized search results. Note that the term "user" in this description actually refers to a web browser instance running on a client computer, not a human being. When two or more persons use the same browser instance, they share the same user identifier. However, since most browser instances are used by only one person, in most cases a user identifier corresponds to a single user. Technically, though, whenever the term "user" appears in this document, one could instead use the term "client" (noting, however, that the term "client" corresponds to a browser instance and not to a client device, because a client device may host multiple browser instances). In this example the user data 116-N is organized by user identifiers. Given a particular user identifier, the application server 110-N identifies the user profile and/or search history associated with the user identifier to personalize the search result corresponding to the same user identifier (e.g., by reordering the search results so as to bring to the top of the search results those search results most likely to be relevant or of interest to the user).

In some embodiments, the user data is organized by usernames or equivalents. To get personalized search results, a user first submits a login request from a client 102 to the login server 130. After providing correct username and password, the user's identification is authenticated by the login server 130. The authentication result is available to the service server 106-N. When the user sends a search request to the service server 106-N, it gets the user's username or equivalent from the login server 130, identifies the user's profile and/or search history in the user data 116-N, and uses the user profile and/or search history to personalize the search result. As noted above, this approach is inconvenient for protecting the mid-sensitivity personal information, such as a user's search history, because it requires an express login by the user. If the user logs out of the service accidentally, e.g., by closing the web browser window, he might have to re-login to get personalized service.

Figure 2:
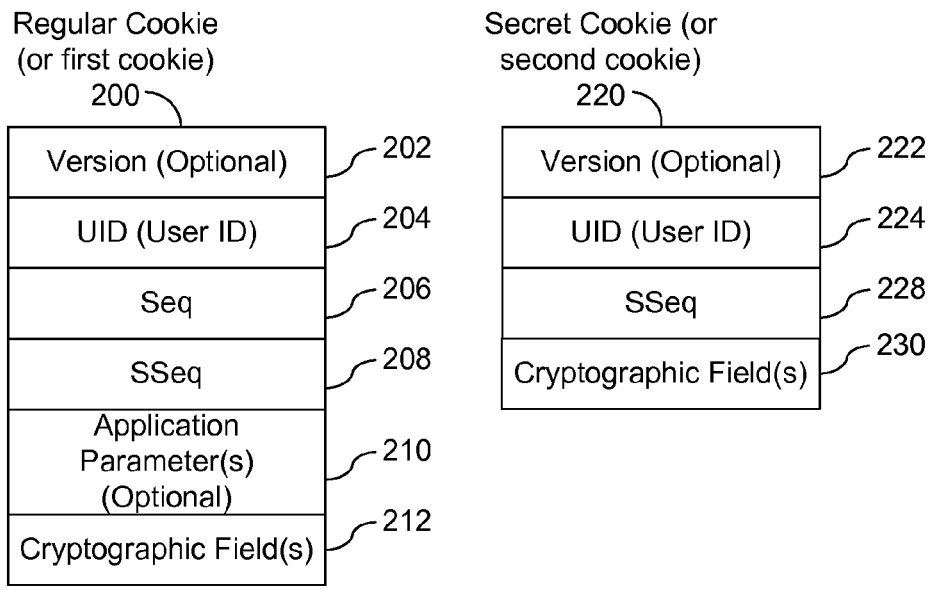
FIG. 2 depicts data structures associated with various types of security objects used by the client-server distributed system according to some embodiments of the invention.

According to some embodiments of the present invention, a cookie server 120 can be used to protect mid-sensitivity personal information for a large number of users using a user identifier (UID) database 103. For each user of the service server 106-N, the cookie server 120 issues two security cookies, herein called "regular cookie" and "secret cookie", each cookie having multiple fields. The regular cookie is sometimes herein called the "first cookie" and the secret cookie is sometimes herein called the "second cookie". FIG. 2 depicts exemplary data structures associated with different types of security cookies issued by the cookie server 120 according to some embodiments of the invention. The regular cookie 200 includes five fields:

Version 202: An integer value indicating the encoding/decoding format of the cookie. It will be incremented whenever new fields are added to the cookie or when the decoding or verification keys are changed. This field is optional.

UID 204: A unique integer value assigned to a particular "user." In some embodiments, it is a sequentially assigned integer value to reduce the chance of collision. For instance, different cookie servers may be responsible for managing different blocks of user identifiers. Generally, a UID size of 64 bits should be enough to last forever. But if not, a sequential assignment scheme makes it easy to grow.

Seq 206: An integer sequence number derived from the system time of the cookie server 120 when the regular cookie 200 was issued. This field indicates the freshness of the cookie. In some embodiments, it is time-shifted to a recent epoch with one-minute granularity to reduce size. In some embodiments, the granularity of the Seq 206 is five minutes, ten minutes, fifteen minutes, or a value between one and twenty minutes, inclusive. In other embodiments, the sequence number is an actual transaction sequence number rather than a timestamp.

Sseq 208: A secure integer sequence number derived from the system time of the cookie server 120 when the secret cookie 200 was issued. This field indicates the freshness of the secret cookie 220 associated with the same UID 204. In some embodiments, it is encoded as a delta from the Seq 206. In various embodiments, the granularity of the Sseq 208 is one minute, five minutes, ten minutes, fifteen minutes, or a value between one and twenty minutes, inclusive. In other embodiments, the secure sequence number is an actual transaction sequence number rather than a timestamp. Since the secret cookie 220 is never issued before the corresponding regular cookie 200 (having the same UID), the Sseq 208 never exceeds the Seq 206.

Application Parameter(s) 210: These are optional parameters associated with the specific application server 110. In some embodiments, application parameters are stored in a database and are uniquely identified by the corresponding UID 204. Examples of application parameters 210 are parameters indicating a last transaction performed by or for the user, a last website location accessed by the user, user preferences for an application, and user entered information which is stored in a cookie instead of a database at the application server 110.

The secret cookie 220 includes three fields:

Version 222: An integer value indicating the encoding/decoding format of the cookie. In some embodiments, the secret cookie 220 and the regular cookie 200 are authenticated using different authentication schemes. For example, in one embodiment, the regular cookie 200 is authenticated using a pair of public and private keys while the secret cookie 220 is authenticated using a symmetric key. As a result, Version 222 may be different from Version 200. This field is optional.

UID 224: A unique integer value assigned to a particular user. In some embodiments, this field is the same as the UID 204 in the regular cookie 200 for the same user.

Sseq 228: A secure integer sequence number derived from the system time of the cookie server 120 when the secret cookie 220 was issued. This field identifies the age of the secret cookie. In some embodiments, this field is the same as the Sseq 208 in the corresponding regular cookie 200 (i.e., having the same UID), except that it is not expressed as a delta from the Seq 206 of the regular cookie. As noted above, in other embodiments the sequence number Sseq 228 is a transaction sequence number rather than a timestamp.

In some embodiments, the fields of the regular cookie 200, other than the Version 202, are digitally signed and encrypted. Cryptographic field(s) 212 (first cookie) and 230 (second cookie) represent digital signatures and/or other cryptographic information included in the first and second cookies, respectively. In other embodiments, the regular cookie 200 (or a portion of the regular cookie 200) is digitally signed, but is not necessarily encrypted. In one embodiment, a regular cookie (other than the Version 202) is digitally signed and encrypted using a private key, of a private-public key pair. The private key is known only to the cookie server(s) 120, while the public key for decrypting and authenticating the regular cookie is known by the front end servers 108. In other embodiments, the payload fields of the regular cookie (e.g., excluding the Version 202 and application parameters 210) are digitally signed but not encrypted, thereby enabling authentication of the secret cookie by the cookie server(s) 120.

In some embodiments the fields of the secret cookie 220, other than the Version 222, are encrypted. For example, the fields of the secret cookie 220, other than the Version 222, are encrypted using a symmetric cipher (i.e., using a symmetric key that is used for both encrypting and decrypting secret cookies 220). The encryption/decryption key used for encrypting and decrypting secret cookies is known only to the cookie server(s) 120. In other embodiments, the payload fields of the secret cookie (e.g., excluding the Version 222) are digitally signed but not encrypted, thereby enabling authentication of the secret cookie by the cookie server(s) 120.

This dual-cookie approach has several advantages. First, it does not require a user to provide a username and password. Even if the user closes one instance of a web browser and submits a search request through a new instance of the same web browser, the user's regular cookie will be sent along with the search request. As a result, the service server 106-N is still able to identify the user data for the user (e.g., the user's search history) and thereby provide a personalized result. Second, the dual-cookie approach is highly secure because it is difficult for an identity infiltrator to steal or intercept a user's secret cookie. The secret cookie only appears in the requests submitted to the cookie server 120 and responses produced by the cookie server 120. Since communications between the client 102 and the cookie server 120 typically occur at a much lower frequency than communications between the client 102 and a service server, eavesdropping (and theft of the cookies exchanged by the client and cookie server) is less likely to happen. Moreover, the cookie server 120 is usually assigned to a special sub-domain whose web servers have limited functionality and a tightly controlled interface. Thus, security attacks like cross-site scripting are far less likely. In addition, in some embodiments secret cookies are transmitted exclusively under the protection of a secure socket layer (SSL) to further reduce exposure to eavesdroppers. Third, the dual-cookie approach is capable of detecting whether a user's identity has been illegally obtained by an infiltrator. If this happens, the cookie server 120 can perform a set of predefined remedial actions to prevent the infiltrator from accessing the user's personal information while allowing the user to continue to access his personal information.

Figure 3:
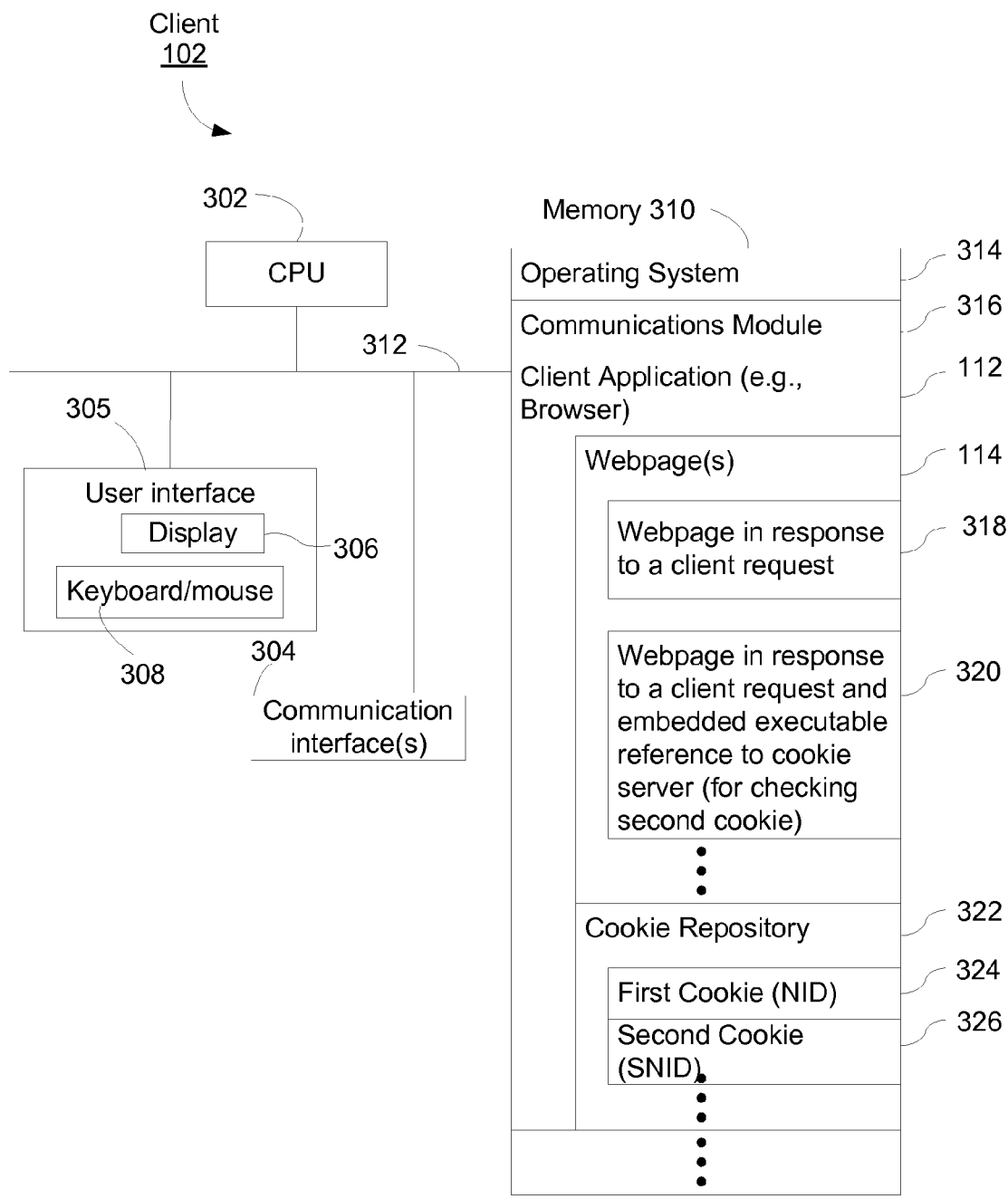
FIG. 3 is a block diagram illustrating the structure of an exemplary client computer according to some embodiments of the invention.

FIG. 3 is a block diagram illustrating the structure of an exemplary client 102 according to some embodiments of the invention, which typically includes one or more processing units (CPUs) 302, one or more network or other communication interfaces 304, memory 310, and one or communication buses 312 for interconnecting these components. The communication buses 312 may include circuitry (sometimes called a chipset) that interconnects and controls communications between the components. The client 102 may also include a user interface 305, which may include a display device 306, a keyboard/mouse 308 and/or other user input devices. Memory 310 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310 stores the following programs, modules and data structures, or a subset or superset thereof:

- an operating system 314 that includes procedures for handling various basic system services and for performing hardware dependent tasks;
- a network communication module (or instructions) 316 that is used for connecting the client 102 to other computers via the one or more communication network interfaces 312 and one or more communication networks, such as the Internet, other wide area networks, local area networks, metropolitan area networks, and the like;
- a client application (or instructions) 112, such as a web browser application, for receiving a user request for a webpage and rendering the requested webpage on the display device 306 or other user interface device;
- one or more requested webpages 114; webpages 114 may include, at various times, a first webpage 318 received in response to a client request to a service server, and a second webpage 320 received in response to a client request to a service server that includes an executable reference to the cookie server 120 (for triggering a request to the cookie server 120 for generating or verifying a secret cookie); note that the regular cookie and the secret cookie are hereinafter referred to as the first cookie and the second cookie, respectively; and
- a cookie repository 322 for storing cookies (sometimes called cookie files or objects) sent by various servers to the client 102, including a first cookie 324 (sometimes called a user's new identifier (NID)) and a second cookie 326 (also known as the user's secret or secure new identifier (SNID)).

The executable reference embedded in a webpage 320 serves primarily one of two purposes. First, if a user requesting the webpage submits a request with no cookie to the front end server 108, the executable reference in the response webpage 320 is used for triggering a request to the cookie server 120 for generating a second cookie SNID for the user. Second, if a user request from a client 102 includes a first cookie NID associated with a user and the front end server 120 is suspicious of the first cookie's authenticity, the executable reference is used for triggering the client 102 to submit the first cookie NID and second cookie SNID associated with the same user to the cookie server 120 for verifying the first cookie's authenticity and, if necessary, performing remedial actions to the first and second cookies. In some embodiments, the executable reference is in the form of an embedded image link or an embedded script that will cause the client 102 to send its second cookie, if any, to the cookie server 120. Below is an exemplary embedded script written in HTML:

<script src=Cookie Server's URL></script>
<noscript>
<img width=1 height=1 src=Cookie Server's URL>
</noscript>

And an example of an embedded image link is as follows
<img width=1 height=1 src=Cookie Server's URL>

Image loading by browsers is deferred by default, which prevents downloading of the image referenced by an image tag from stalling the rendering of the remainder of the web page. An alternate way to defer transmission of the HTTP request to the cookie server is to use an "onload" command in the web page:

<body onload=make-cookieserver-request>
. . . .
<noscript><img src=make-cookieserver-request>
</noscript>

Figure 4:
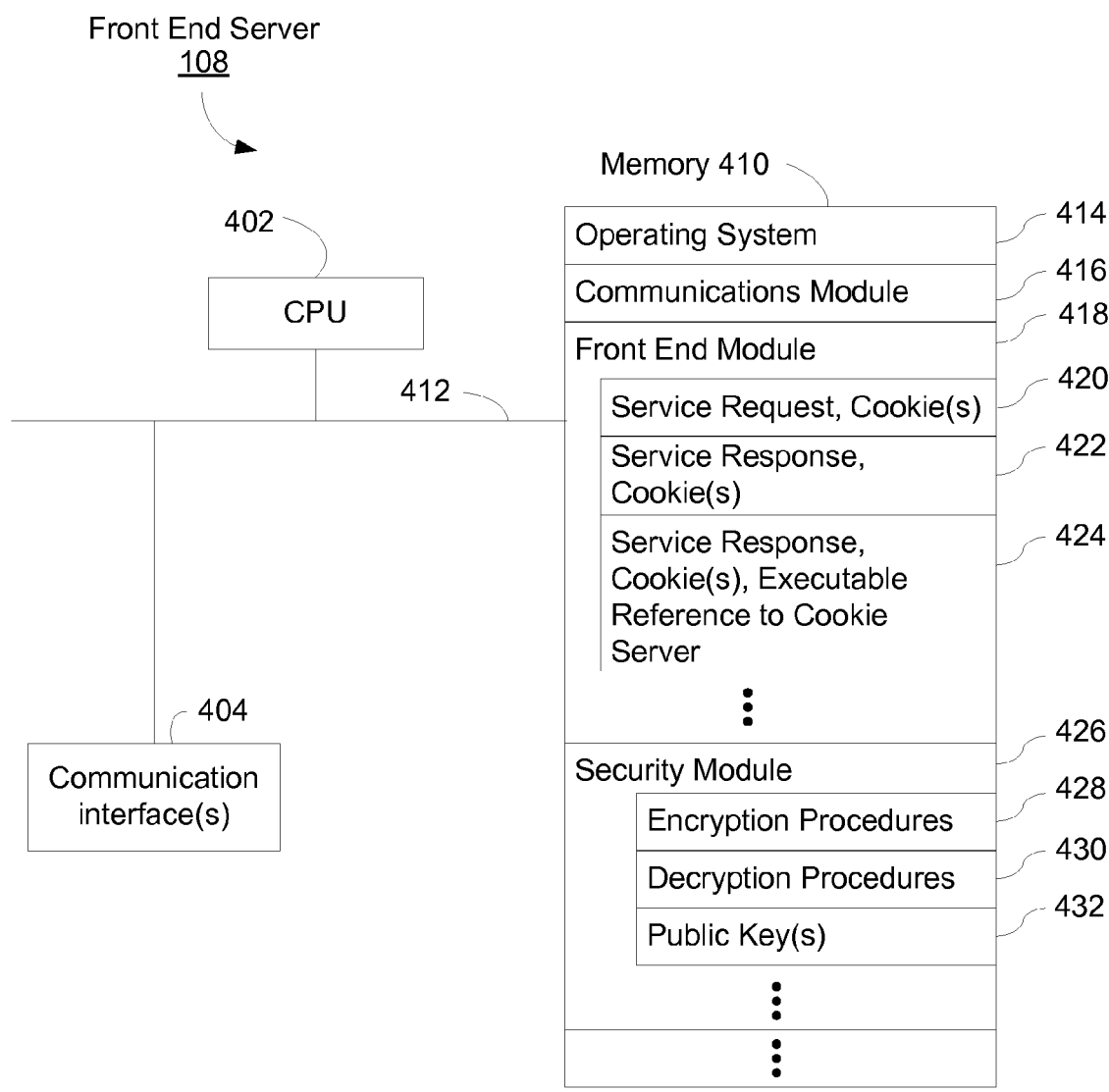
FIG. 4 is a block diagram illustrating the structure of an exemplary front end server computer according to some embodiments of the invention.

FIG. 4 is a block diagram illustrating the structure of an exemplary front end server 108 according to some embodiments of the invention, which typically includes one or more processing units (CPUs) 402, one or more network or other communications interfaces 404, memory 410, and one or more communication buses 412 for interconnecting these components. The communication buses 412 may include circuitry (sometimes called a chipset) that interconnects and controls communications between system components. The front end server 108 may optionally include a user interface comprising a display device and a keyboard. Memory 410 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410 stores the following programs, modules and data structures, or a subset or superset thereof:

- an operating system 414 that includes procedures for handling various basic system services and for performing hardware dependent tasks;
- a network communication module (or instructions) 416 used for connecting the front end server 108 to other computers (e.g., client computers or devices, web hosts, cookie servers, login servers, and other server computers) via the one or more communication network interfaces 404 and one or more communication networks, such as the Internet, other wide area networks, local area networks, metropolitan area networks, and the like;
- a front end module (or instructions) 418 for receiving a service request 420 including zero or more cookies associated with a particular user from a client 102 and returning either a service response 422 including one or more cookies associated with the user under first conditions or a service response 424 including one or more cookies and an executable reference to the cookie server under second conditions; and
- a security module (or instructions) 426 for encrypting/decrypting cookies associated with the service request 420 and the service responses 422, 424, including encryption procedures 428, decryption procedures 430, and public keys 432 (in some embodiments, the corresponding private keys are known only to the cookie server(s) 120), etc.

Figure 5:
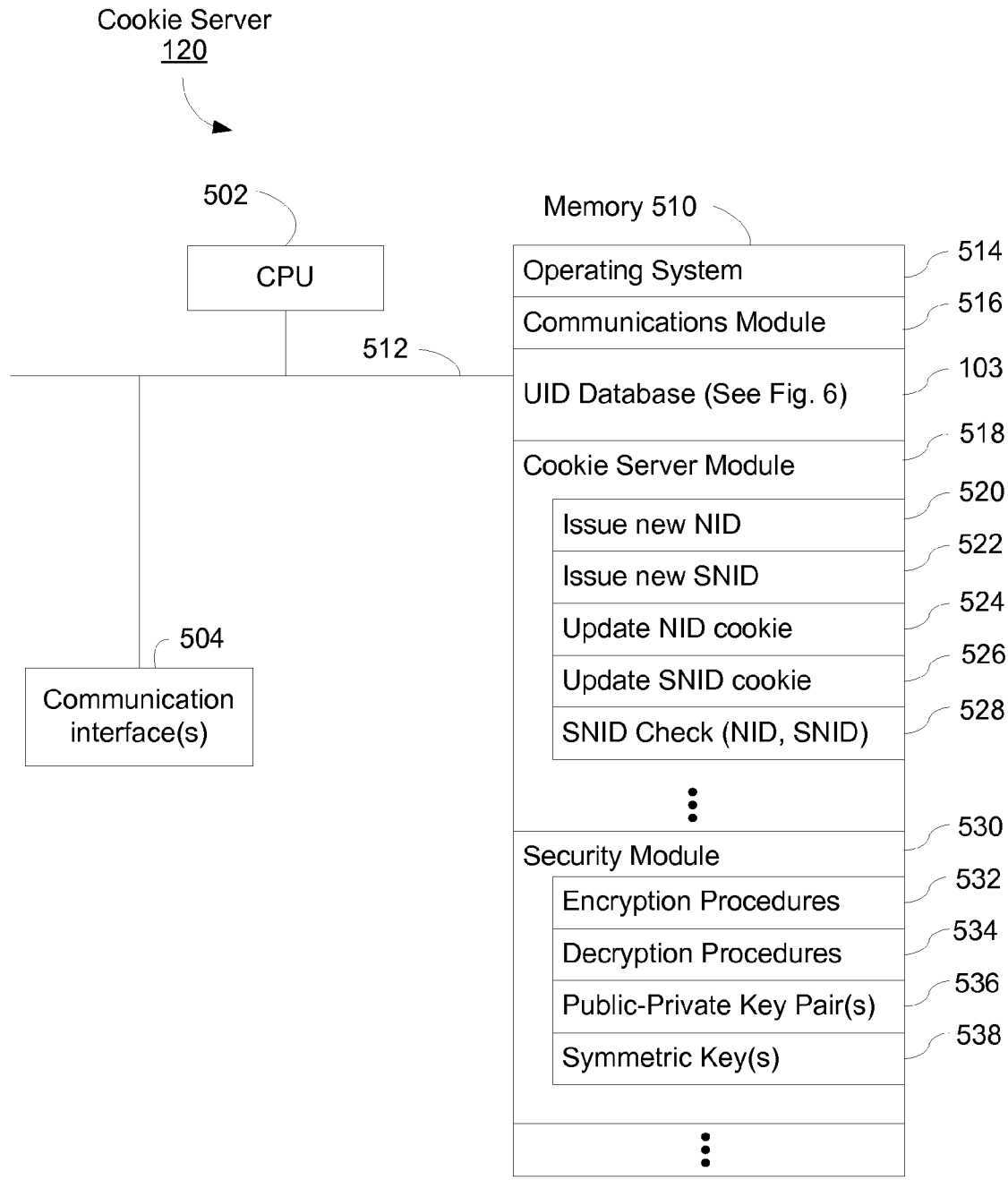
FIG. 5 is a block diagram illustrating the structure of an exemplary cookie server computer according to some embodiments of the invention.
Figure 6:
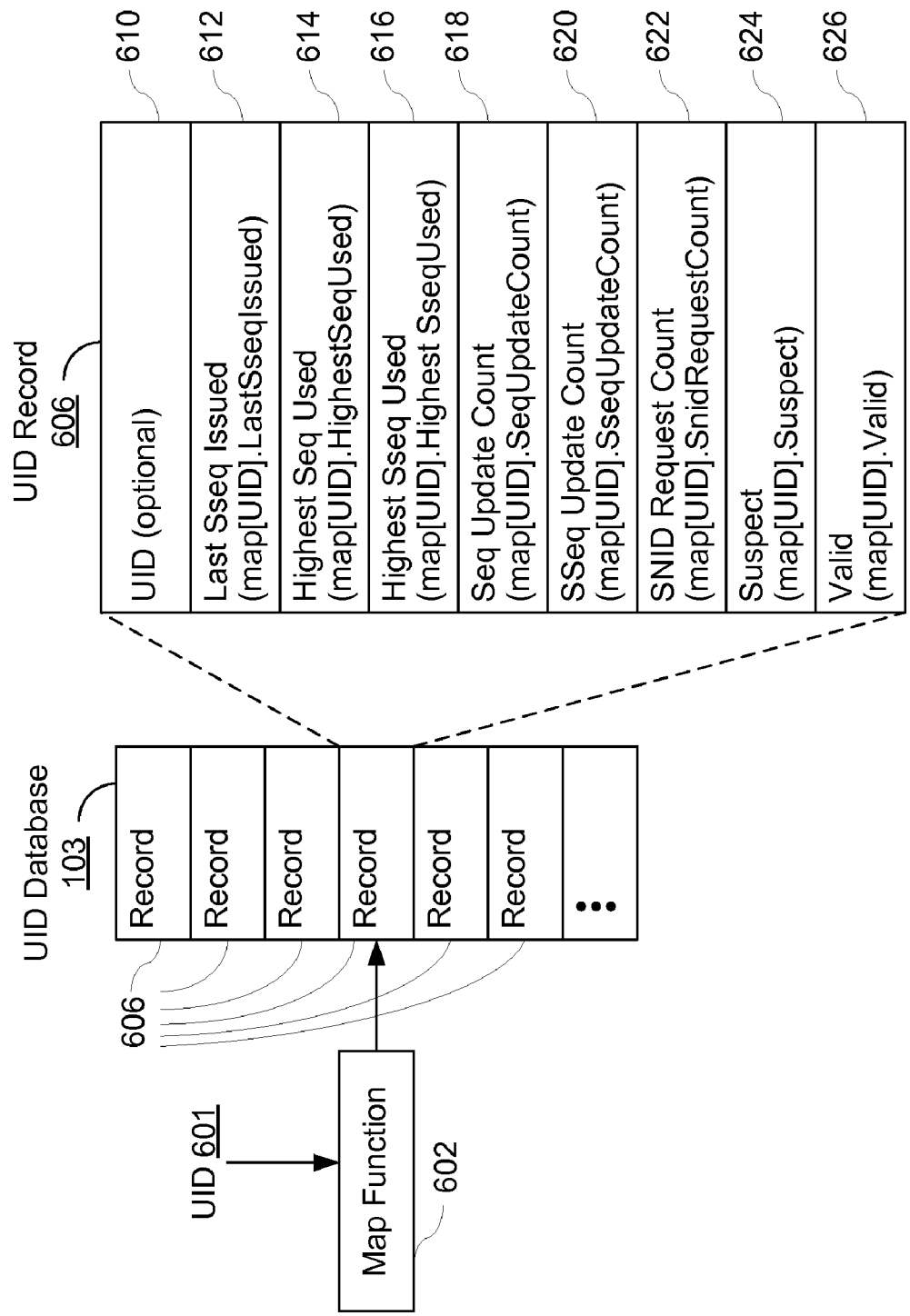
FIG. 6 depicts data structures, used by one or more cookie servers, for tracking the status of a unique user identifier according to some embodiments of the invention.

FIG. 5 is a block diagram illustrating the structure of an exemplary cookie server 120 according to some embodiments of the invention, which typically includes one or more processing units (CPUs) 502, one or more network or other communications interfaces 504, memory 510, and one or more communication buses 512 for interconnecting these components. The communication buses 512 may include circuitry (sometimes called a chipset) that interconnects and controls communications between system components. The cookie server 120 may optionally include a user interface comprising a display device and a keyboard. Memory 510 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510 stores the following programs, modules and data structures, or a subset or superset thereof:

- an operating system 514 that includes procedures for handling various basic system services and for performing hardware dependent tasks;
- a network communication module (or instructions) 516 used for connecting the cookie server 120 to other computers (e.g., client computers or devices, web hosts, service servers, login servers, and other server computers) via the one or more communication network interfaces 504 and one or more communication networks, such as the Internet, other wide area networks, local area networks, metropolitan area networks, and the like;
- a UID database 103 for keeping track of user identifiers (UIDs) issued by the cookie server 120 and the statuses of the UIDs (note that a more detailed description of the UID database 103 is provided below in connection with FIG. 6);
- a cookie server module (or instructions) 518 for performing various operations to first and second cookies issued by the cookie server 120, including a sub-module (or instructions) 520 for issuing a new first cookie NID, a sub-module (or instructions) 522 for issuing a new second cookie SNID, a sub-module (or instructions) 524 for updating a first cookie NID, a sub-module (or instructions) 526 for updating a second cookie SNID, and a sub-module (or instructions) 528 for checking a second cookie SNID in connection with a first cookie NID, etc; and
- a security module (or instructions) 530 for encrypting/decrypting cookies issued by the cookie server 120, including encryption procedures (or instructions) 532, decryption procedures (or instructions) 534, public-private key pairs 536, and symmetric keys 538, etc.

As noted above, the Seq and Sseq fields in the cookies NID and SNID indicate when a cookie was generated by the cookie server 120. To prevent an identity infiltrator from using an illegally obtained cookie, the cookie server 120 updates these fields repeatedly. To do so, the cookie server 120 keeps track of the status of each issued cookie. FIG. 6 depicts data structures used for storing and retrieving the status of a UID according to some embodiments of the invention.

When issuing a new UID 601, the cookie server 120 stores a new UID record 606 in the UID database 103. Optionally, the location of the new UID record 606 may be determined or referenced by a map function 602. In some embodiments, the UID record 606 includes the following fields, or a subset or superset thereof:

- UID 610: The unique integer value assigned to a particular user. In some embodiments, this field is optional if the map function 602 always associates a UID 601 with a unique record 606 in the UID database 103.
- LastSseqIssued 612: The last secure sequence number Sseq assigned to a second cookie SNID having the UID 610. In some embodiments, this field is accessed through the expression "map[UID].LastSseqIssued."
- HighestSeqUsed 614: The highest sequence number Seq ever presented by a received first cookie NID having the UID 610. In some embodiments, this field is accessed through the expression "map[UID].HighestSeqUsed."
- HighestSseqUsed 616: The highest secure sequence number Sseq ever presented by a user in the first cookie NID or second cookie SNID having the UID 610. In some embodiments, this field is accessed through the expression "map [UID].HighestSseqUsed."
- SeqUpdateCount 618: The number of times that the cookie server 120 has issued a new sequence number Seq in a first cookie NID having the UID 610 since the HighestSeqUsed 614 was last updated. In some embodiments, this field is accessed through the expression "map[UID].SeqUpdateCount." SeqUpdateCount 618 can be considered to be the number of times that the cookie server has attempted to get a client to accept a new or updated first cookie.
- SseqUpdateCount 620: The number of times that the cookie server 120 has issued a new secure sequence number Sseq in a second cookie SNID having the UID 610 since the HighestSseqUsed 616 was updated. In some embodiments, this field is accessed through the expression "map[UID].SseqUpdateCount." SseqUpdateCount 620 can be considered to be the number of times that the cookie server has attempted to get a client to accept a new or updated second cookie.
- SnidRequestCount 622: The number of times that the front end server 108 has issued, in a response sent to client 102, a webpage having an executable reference to the cookie server since the HighestSseqUsed 616 was updated. The purpose of the executable reference in the webpage is to trigger the client 102 to send a second cookie SNID having the UID 610 to the cookie server. In some embodiments, this field is accessed through the expression "map[UID].SnidRequestCount." The SnidRequestCount 620 for a UID can be considered to be the number of times that the front end server has attempted to get a client to send a second cookie SNID having the UID 610 to the cookie server.
- Suspect 624: A Boolean value indicating whether the UID 610 is exhibiting suspicious behavior. For example, if the client 102 has refused to update its second cookie SNID including the UID 610 for a certain number of times, the cookie server 120 may mark the UID 610 as suspect. In some embodiments, this field is accessed through the expression "map[UID].Suspect." In some embodiments, once the Suspect 624 field for a UID has been set, the UID is effectively and permanently disabled. The Suspect 624 field is optional, and may be omitted in some embodiments. For example, in some embodiments, suspect UIDs are invalidated, or removed from the UID database 103.
- Valid 626: A Boolean value indicating whether the UID 610 is valid. For example, if the second cookie SNID has a secure sequence number Sseq lower than the HighestSseqUsed 616, the cookie server may mark the UID 610 as invalid. In some embodiments, this field is accessed through the expression "map[UID].Valid." The Valid 626 field is optional. In some embodiments, when a UID is invalidated the associated UID record 606 is deleted from the UID database 103, thereby eliminating the need for the Valid field 626.

Initially, all fields associated with the new UID 610 are set to zero except the Valid field 626, which is set to "True". Subsequently, whenever the cookie server 120 receives the first or second cookie including the UID 610, it may examine at least one of the fields and update some of the fields as well as certain fields of the first and second cookies, if necessary, under predefined conditions. A more detailed description of the operations by the cookie server 120 under different conditions is provided below in connection with FIGS. 12A to 12D and 13A to 13C. But first, it is helpful to have an overview discussion of the interactions between the three entities, the client 102, the front end server 108, and the cookie server 120.

Figure 7:
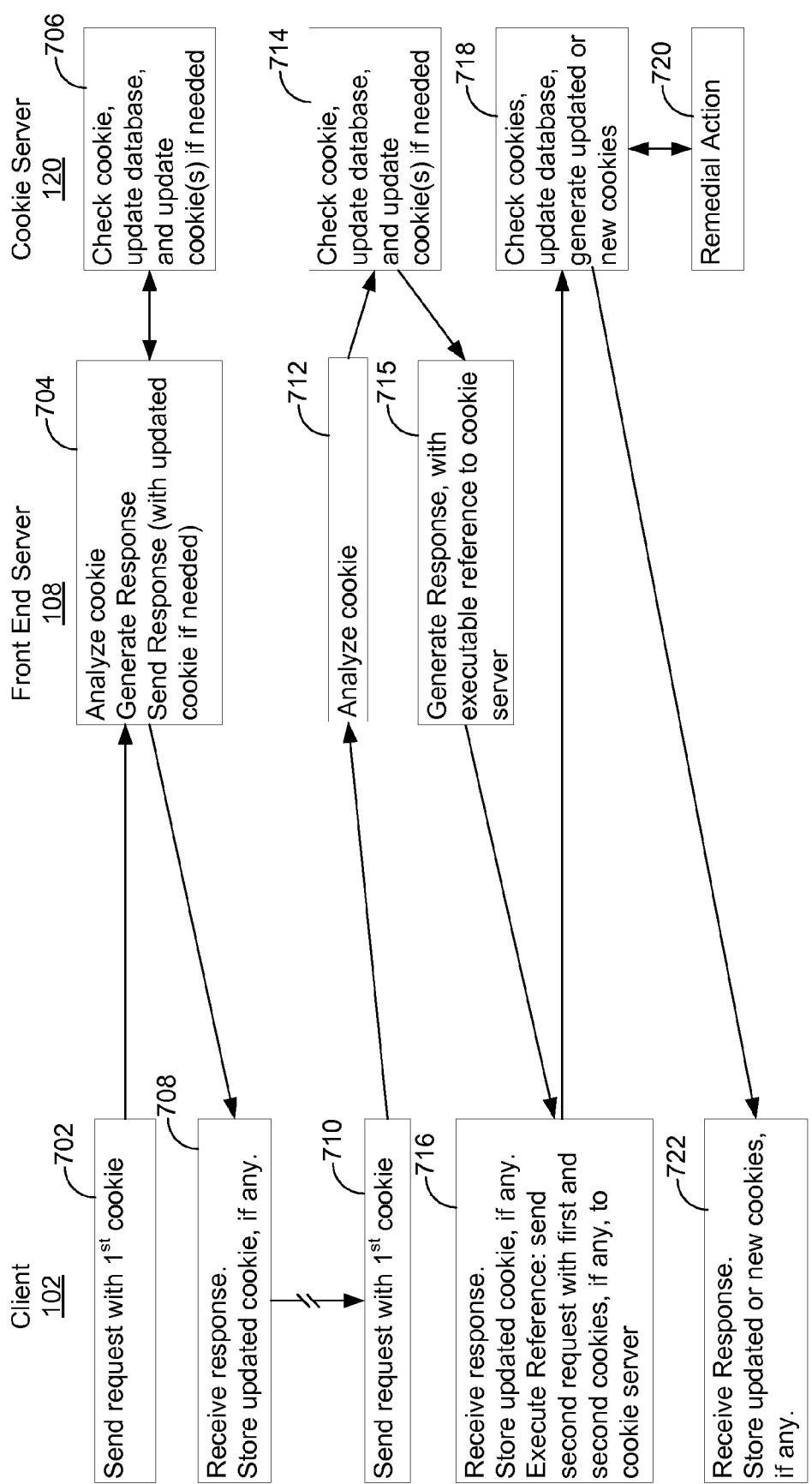
FIG. 7 is an overview diagram illustrating how a client, front end server and cookie server interact with one another according to some embodiments of the invention.

FIG. 7 is such an overview diagram illustrating how the client 102, the front end server 108 and the cookie server 120 interact with one another according to some embodiments of the invention. The interactions start with the client 102 sending a request for a webpage to the front end server 108 (702). For illustrative purposes, we assume that the request includes a first cookie NID.

Upon receipt of the request, the front end server 108 may perform a set of predefined operations 704, including analyzing or authenticating the first cookie NID (e.g., decrypting the first cookie NID, authenticating a digital signature included in the first cookie NID, and analyzing the UID, Seq and Sseq fields of the first cookie NID). A more detailed description of this analysis is provided below in connection with FIG. 11. Based upon the analysis result, the front end server 108 may request that the cookie server 120 perform some further operations 706 to the first cookie NID. In some embodiments, these further operations may include updating the first cookie NID, updating the record identified by map[NID.uid] in the UID database 103, and returning the updated first cookie NID to the front end server 108.

Under certain conditions (e.g., the first cookie NID is fresh), the two sets of operations 704 and 706 may, at least partially, proceed concurrently. For example, the front end server 108 may request the cookie server 120 to perform the operations 706, e.g., updating the record identified by map [NID.uid] using an asynchronous remote procedure call (RPC). On the other hand, since the first cookie NID is fresh, the front end server 108 may perform the operations 704 simultaneously, including requesting a webpage from the application server 110 using the UID of the first cookie NID, preparing a response including the webpage and the first cookie, and sending the response back to the client 102. Under other conditions (e.g., the first cookie NID is stale), the front end server 108 has to wait for the cookie server 120 to finish its operations 706 (e.g., returning the updated first cookie NID to the front end server 108) before proceeding with any remaining steps in the operations 704.

Next, the client 102 receives the response from the front end server 108, renders the webpage to the requesting user, and stores the updated first cookie NID (708). Typically, without limitation, the updated first cookie NID is stored in a cookie cache at the client 102, thereby replacing any earlier cookie referencing the same URL. This completes a cycle of communication between three entities with the user getting the requested webpage (e.g., a personalized search result). During this communication cycle, it is assumed that the front end server 108 receives a normal first cookie NID, fresh or not, from the client 102. Since the cookie server 120 has not detected any abnormal behavior by the client 102 from the first cookie NID, it does not attempt to trigger the client 102 to submit the second cookie SNID for further authentication.

In contrast, the communication cycle discussed below involves an "abnormal" behavior by the client 102 that requires the authentication of the second cookie SNID. For illustrative purposes, assume that there is a long period of silence (e.g., a couple of months) between the client 102 and the front end server 108. During this time period, the front end server 108 has not received any request from the client 102. The first cookie NID stored at the client 102 becomes old or stale.

When the client 102 submits another request including the first cookie NID to the front end server 108 (710), the front end server 108 analyzes the first cookie NID (712). Since the first cookie has a very old Seq, the front end server forwards the first cookie NID to the cookie server 120. A further examination by the cookie server 120 indicates that both the Seq and Sseq fields of the first cookie NID are outdated. This requires an update to both the first cookie NID and the second cookie SNID.

For security reasons, when responding to a cookie check sent by the front end server, the cookie server 120 only updates the first cookie NID (714). The update to the second cookie SNID, if any, is postponed until the cookie server 120 receives a separate request directly from the client 102. This approach helps to detect situations in which an interloper has illegally obtained a copy of the first cookie, but is not in possession of a matching second cookie. As described below, in such cases the cookie server undertakes remedial actions to cut off the interloper's use of the illegally obtained first cookie.

After receiving the updated first cookie NID from the cookie server 120, the front end server 108 generates a response and inserts into the response an executable reference to the second server (e.g., a script or object reference) (715). When the client 102 receives the response (716), it stores the updated first cookie NID in its memory and renders the response to the requesting user. In addition, the client 102 executes the script embedded in the response and generates a second request to the cookie server 120. The second request includes both the (updated) first cookie NID and the (stale) second cookie SNID. This request triggers the cookie server to update the second cookie SNID.

When the cookie server 120 receives the second request, it performs a set of operations 718, including updating both the first cookie NID and the second cookie SNID, updating the database record identified by map[NID.uid] and returning the updated first cookie NID and the second cookie SNID as a response to the second request. In some circumstances, in addition to updating the two cookies, the cookie server 120 also performs certain remedial actions 720 (e.g., deleting illegally obtained cookies from a client 102).

In some embodiments, the arrival of the second response at the client 102 has little or no visible impact on the webpage being rendered to the user. For example, the communication between the client 102 and the cookie server 120 may involve only the update of the two cookies. Alternately, the communication between the client 102 and the cookie server 120, in addition to updating the cookies, may update a small portion of the webpage that is not visible to the user (e.g., a frame that is not displayed) or it may update a small portion of the webpage (e.g., a single pixel) with an "image" that is identical to the prior content of the webpage, thereby leaving no visual impact on the webpage. In yet another alternate embodiment, the communication between the client 102 and the cookie server 120, in addition to updating the cookies, may update a small portion (e.g., a single pixel, or a region of sixteen or fewer pixels) of the webpage that is visible. In yet another embodiment, the communication includes an empty script (e.g., a script tag having a source location at the cookie server, but which corresponds to an empty or non-existent file) that has no affect on the webpage at all. The script tag for the empty script causes an HTTP request to be sent to the cookie server; the HTTP request includes both the first cookie NID and second cookie SNID from the client, which are then processed by the cookie server, as described elsewhere in this document.

Both the first cookie NID and the second cookie SNID stored in the client 102 have up-to-date sequence numbers after the update. But the webpage associated with the previous request to the front end server 120 remains intact or substantially unchanged.

Figure 8:
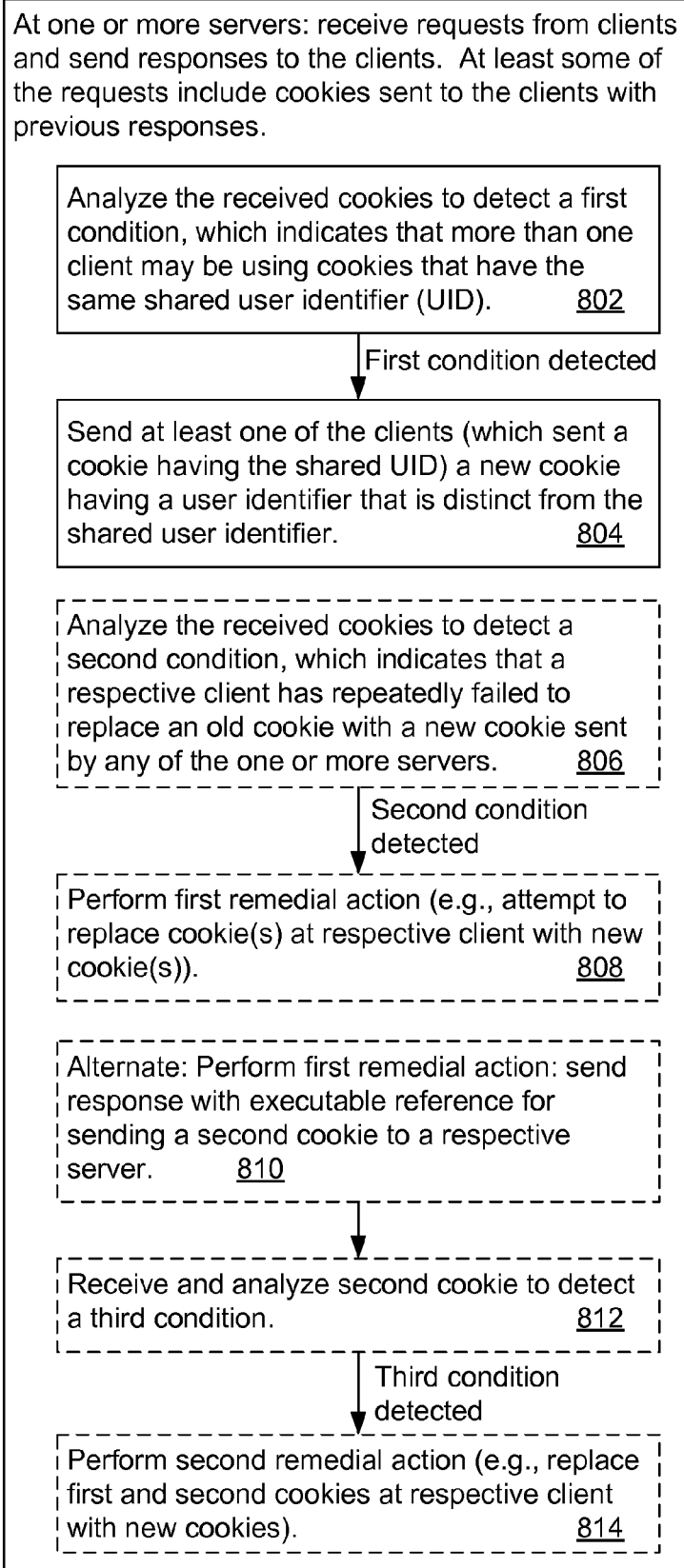
FIG. 8 is a flowchart illustrating how the front end server and the cookie server analyze a first cookie received from a client according to some embodiments of the invention.

FIG. 8 is a flowchart illustrating how the front end server 108 and the cookie server 120 analyze the first cookie NID under certain conditions from the client according to some embodiments of the invention. As noted above, the front end server 108 and the cookie server 120 receive requests from clients 102 and send responses to the clients 102. At least some of the requests by the clients 102 include first cookies NIDs previously sent to the clients 102 as part of previous responses by the front end server 108 and the cookie server 120.

In some embodiments, the client server 120 analyzes a received first cookie NID to detect a first condition, which indicates that more than one client may be using first cookies NIDs that share the same user identifier UID (802). In other words, if the first condition is detected, the received first cookie NID has probably been illegally obtained from its authentic user. For example, the first condition is met if NID.Seq is less than map[NID.UID].HighestSeqUsed or NID.Sseq is less than map[NID.UID].HighestSseqUsed. In other words, there was at least one previous client request presenting a first cookie having a higher sequence number Seq or a higher secure sequence number Sseq (than in the first cookie sent with the current request), but the same user identifier UID. In general, the first condition does not occur unless a user other than the authentic user of the first cookie NID gets a copy of the first cookie NID and attempts to use it to impersonate the authentic user while accessing a service server.

Upon detecting the first condition, the front end server 108 replaces the illegally obtained first cookie NID with a new first cookie EMPTY_NID in generating a response to the client's request (804). The first cookie EMPTY_NID has a user identifier UID different from that of the first cookie NID. In some embodiments, this first cookie EMPTY_NID is a null value. If the client's browser is operating properly, the new first cookie will replace the illegally obtained first cookie in the client's cookie cache, which will prevent the client 102 from accessing the authentic user's personal information. Thus, the client 102 receives a response from the application server 110 (or the service server 106) that is independent of the respective user identifier in the first cookie NID that was included with the client's request. For example, if the service server 106 is a search engine, the client 102 receives generic search result, not a personalized one, because the search is performed using an empty first cookie.

In some other embodiments, the client server 120 analyzes a received first cookie NID to detect a second condition, which indicates that a respective client 102 has repeatedly failed to replace the first cookie NID with a new one forwarded by the front end server 108 for a predetermined number of times (806). In this case, the cookie server 120 performs a first remedial action, e.g., by using a new first cookie EMPTY_NID to generate a response for the client 102 (808). Again, the use of the new first cookie EMPTY_NID to generate the response avoids exposing the authentic user's personal information to the client which is suspected of being an interloper.

In yet some other embodiments, besides the generic response (which is independent of the user identifier in the cookie sent with the client's request), the client 102 is also triggered by an executable reference, embedded the response, to submit its second cookie SNID (if any) to the cookie server 120 (810). If the client 102 is unable to provide a second cookie SNID whose UID matches the UID in the first cookie NID, the cookie server 120 attempts to delete the suspicious first cookie NID from the client 102's memory to prevent the client 102 from using the suspicious first cookie NID. For example, the cookie server 120 may send expired first and second cookies NID and SNID to the client 102, which, if accepted, will result in the previously stored first and second cookies being overwritten with cookies that will be automatically deleted from the client's cache because they are already expired.

If the client 102 provides the second cookie SNID, the cookie server 120 analyzes the second cookie SNID to detect a third condition (812). For example, the third condition is met if SNID.Sseq is less than map[SNID.UID].HighestSseqUsed. In other words, there was at least one previous client request presenting a second cookie having a higher secure sequence number Sseq but the same user identifier UID. This suggests that the client 102 has an illegally obtained second cookie SNID. If so, the cookie server 120 performs a second remedial action, e.g., by sending to the client 102 new first and second cookies, having a new user identifier UID, to replace the two cookies previously stored by the client 102 (814).

FIG. 9 is a flowchart illustrating how the cookie server 120 analyzes a second cookie from the client according to some embodiments of the invention. The front end server 108 associated with a first domain receives first requests from clients 102 and sends first responses to the clients 102 (902). At least some of the first requests include first cookies NIDs sent to the clients 102 with previous responses. The cookie server 120 associated with a sub-domain of the first domain receives second requests from the clients 102 and sends second responses to the clients 102 (904). At least a subset of the second requests includes second cookies SNIDs.

Upon receipt of a second cookie SNID, the cookie server 120 analyzes the received second request to detect a first condition, which indicates that a respective client 102 is using a respective first cookie NID that belongs to a second client 102 (906). For example, if the respective client 102 is unable to provide a valid second cookie associated with the second client 102, the first cookie used by the respective client 102 could be an illegally obtained one. When this first condition is detected, the cookie server 120 performs remedial actions, e.g., by sending a response to the respective client 1092 to cause the respective first cookie to be deleted from the respective client 102 (908). As explained above, sending an expired first cookie to the respective client 102 with the response will cause the first cookie used by the respective client 102 to be deleted, so long as the browser of the first client is operating properly. Remedial actions that detect and handle clients with improperly operating browsers are discussed below.

Figure 10:
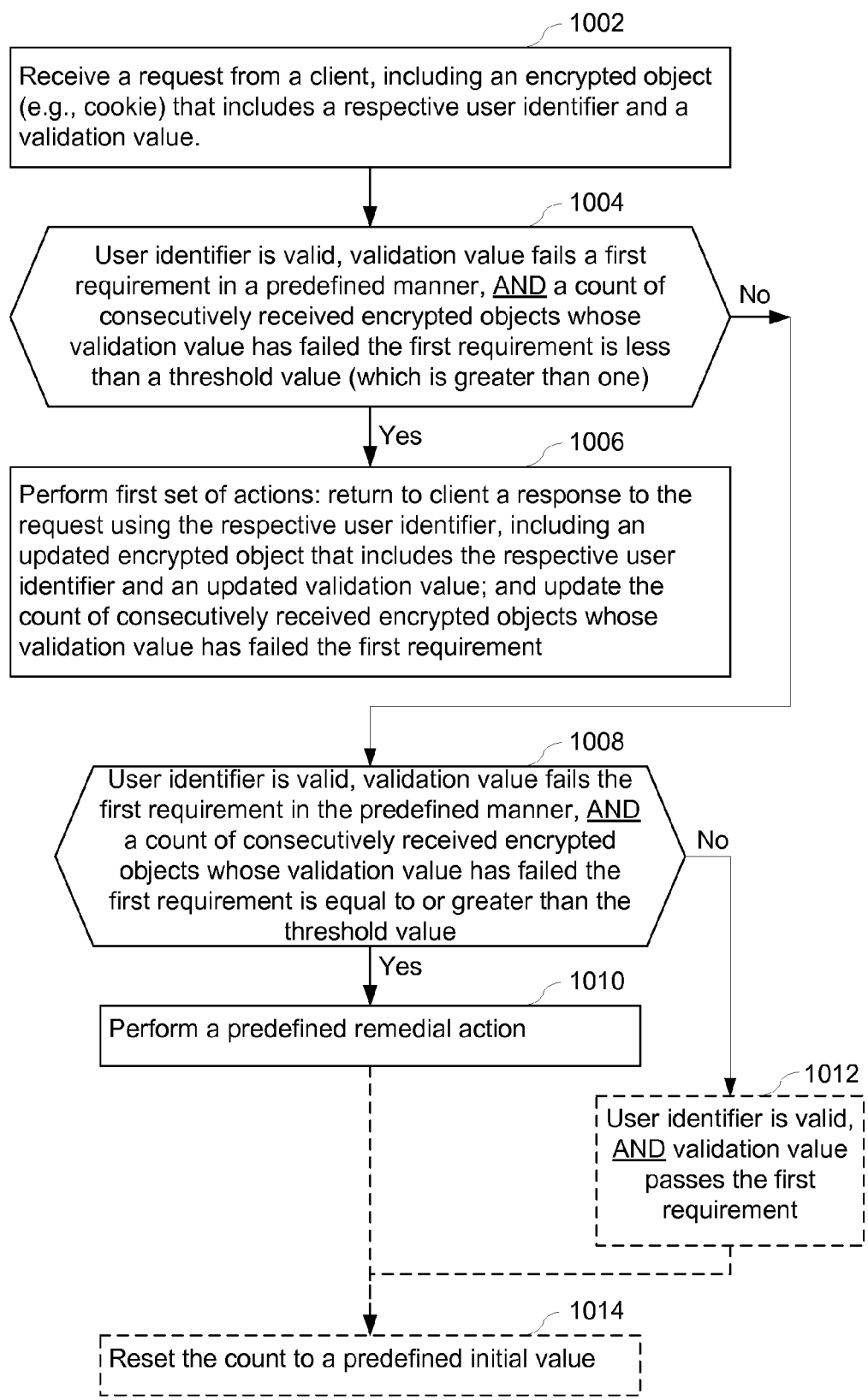
FIG. 10 is a flowchart illustrating how the front end server and the cookie server perform remedial actions when various error conditions concerning cookies received from a respective client are detected according to some embodiments of the invention.

FIG. 10 is a flowchart illustrating how the front end server 108 and the cookie server 120 perform remedial actions to the first cookie NID and the second cookie SNID associated with the client 102 according to some embodiments of the invention. Initially, the front end server 108 receives a request from the client 102, including an encrypted first cookie NID (1002). The first cookie NID includes at least a unique user identifier UID and a validation value such as a sequence number Seq. After authenticating the first cookie NID (e.g., by decrypting the first cookie and authenticating its digital signature), the front end server 108 checks its associated fields and compares these fields against a data record identified by the same user identifier UID in the UID database 103.

At operation 1004, the process checks to see if the user identifier UID is valid but the sequence number Seq fails a first requirement in a predefined manner (e.g., the sequence number Seq in the first cookie is either invalid or stale). If a count of consecutively received first cookies whose sequence number Seq has failed the first requirement is less than a threshold value (e.g., 5) (1004, yes), the front end server 108 performs a first set of remedial actions, e.g., by returning to the client 102 a response, including an updated encrypted first cookie NID that includes the respective user identifier UID and an updated sequence number Seq, and updating (in the UID database 103) the count of consecutively received encrypted first cookies whose sequence number has failed the first requirement (1006).

If the count of consecutively received first cookies whose sequence number Seq has failed the first requirement is equal to or greater than the threshold value (1008, yes), the cookie server 120 performs a second set of predefined remedial actions (1010). Exemplary remedial actions include returning a default first cookie EMPTY_NID and triggering a check for the second cookie SNID (e.g., by including an executable reference to the cookie server in the response). Otherwise (1008, no), the user identifier UID should be valid and the sequence number Seq should pass the first requirement (1012). In this case, the front end server 108 performs normal actions including returning to the client 102 a response to the request using the user identifier UID. In some embodiments, the response includes the same encrypted first cookie NID received at operation 1002. Optionally, after performing the remedial action 1010, or determining that the received first cookie is valid (1008, no), the cookie server 120 also resets the count of consecutively received first cookies whose sequence number Seq has failed the first requirement to zero (1014).

As noted above in connection with FIG. 7, the communication cycle involves transactions between three entities, the client 102, the front end server 108, and the cookie server 120. Depending on the status of the first and second cookies associated with the client 102, the front end server 108 and the cookie server perform different sets of predefined actions. Below is a more detailed description of how the two servers operate under different conditions.

Figure 11:
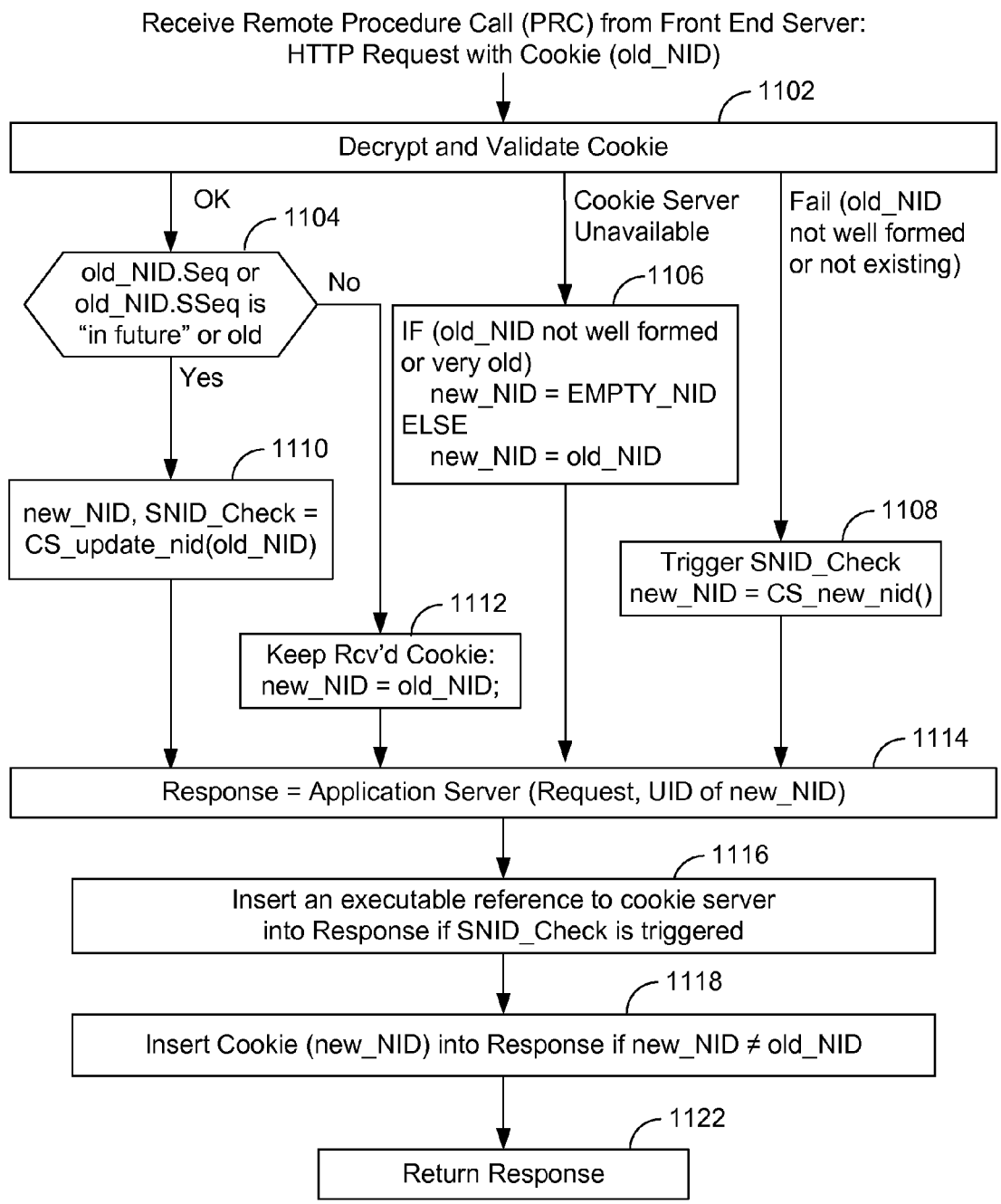
FIG. 11 is a detailed flowchart illustrating how the front end server analyzes a first cookie received from a client according to some embodiments of the invention.

FIG. 11 is a flowchart illustrating how the front end server 108 analyzes the first cookie old_NID from the client 102 in detail according to some embodiments of the invention. The decryption, digital signature authentication and initial examination of the first cookie old_NID have three possible outcomes (1102).

First, the first cookie old_NID is decrypted and checked to determine if its digital signature is authentic (1102). If so, the front end server 108 checks whether any of the first cookie old_NID's sequence numbers Seq and Sseq is old or invalid (1104). In some embodiments, a sequence number is invalid if it exceeds the front end server's system time by more than a predefined number of minutes (e.g., 5 to 10 minutes). If true (1104, yes), the front end server 108 forwards the first cookie old_NID to the cookie server 120 for further examination through a remote procedure call CS_update_nid(old_NID) (1110). Otherwise (1104, no), the front end server 108 treats the first cookie as fresh and renames it as new_NID. In some embodiments, the front end server also invokes an asynchronous remote procedure call CS_inform_cookie_server (new_NID), which causes the cookie server 120 to update its own database record identified by the user identifier "new_NID.UID."

Second, if the cookie server 120 is not available at the moment (e.g., due to network communications problems, a server problem, or excessive demand on the cookie server), the front end server 108 has limited means in evaluating the reliability of the first cookie old_NID (1106). If the first cookie old_NID is not well formed or very old (see discussion below of what makes a cookie "old" or "very old"), it is deemed unreliable and the front end server 108 uses a default first cookie EMPTY_NID in preparing a response to the client 102's request. In some embodiments, a cookie is not well formed if the front end server 108 or the cookie server 120 is unable to decrypt the cookie correctly. A cookie is very old if its associated sequence number Seq or Sseq has an age greater than a threshold value (e.g., one month). It is noted that the threshold for very old Seq values may be different than the threshold for very old Sseq values. If the first cookie old_NID is well formed and not very old, it is deemed reliable and the front end server 108 uses it to access the mid-sensitivity personal information in preparing a response to the client 102's request. In this circumstance, the response will generally not include a replacement for the first cookie. In other embodiments, the "cookie server unavailable" condition may be treated in other ways, such as by always (i.e., without regard to the content of the first cookie) returning a generic response that does not use the UID in the received first cookie, but which does not send a replacement first cookie with the response.

Third, if the cookie server 120 is available but the front end server is unable to decrypt the first cookie old_NID or none was sent, this may be a first-ever request by the client 102 to the front end server 108. Therefore, the client 102 does not have a first cookie corresponding to the service server to which the request was sent. In this situation, the client 102 is going to receive a generic response since no user's personal information can be used to personalize the response. This scenario is also possible if the first cookie is corrupted. For security reasons, the request by the client 102 is also treated as a first-ever request to the front end server 108. In either case, the front end server 108 submits another remote procedure call CS_new_nid( ) to the cookie server 120 to request a new first cookie for the client 102 (1108). The response to the client 102 also includes the aforementioned executable reference to the cookie server, which triggers the client 102 to submit a separate request to the cookie server 120. The cookie server responds to that request from the client 102 with a second cookie (i.e., the secret cookie) that has the same UID as the new first cookie sent to the client by the front end server.

Regardless of what outcome is derived from the operation 1102, the front end server 108 submits a request to the application server 110 using the new first cookie new_NID and receives a response from the application server 110 (1114). As noted above, the response may be personalized or not depending on whether the new first cookie is a generic one EMPTY_NID and whether there is any personal information associated with the first cookie new_NID. After receiving the response from the application server 110, the front end server 108 inserts into the executable reference to the cookie server if the cookie server 120 requires the client 102 to submit a check for the second cookie SNID (1116).

Next, the front end server 108 checks if the new first cookie new_NID is different from the old one old_NID (1118). As noted above, if the request is a first-ever request from the client 102, the client 102 does not have any cookie in its memory for the service server 106. The new first cookie new_NID (which is digitally signed, and optionally encrypted by the cookie server when it is generated) should be returned to the client 102 such that the client 102 can use this cookie to uniquely identify itself in the future. In this case, the front end server 108 may insert the new first cookie into the response before it is returned to the client 102 (1122).

As implied above, between the front end server 108 and the cookie server 120, the latter is directly responsible for generating, updating, and invalidating the security cookies. The front end server 108 performs a preliminary analysis of received first cookies and invokes different remote procedure calls to the cookie server 120 when the first cookie is missing or fails one or more checks.

FIGS. 12A to 12D are flowcharts of the different remote procedure calls from the front end server to the cookie server, illustrating in detail how the cookie server 120 analyzes the first cookie NID sent by a client 102 to a front end server and performs remedial actions according to some embodiments of the invention.

Figure 12A:
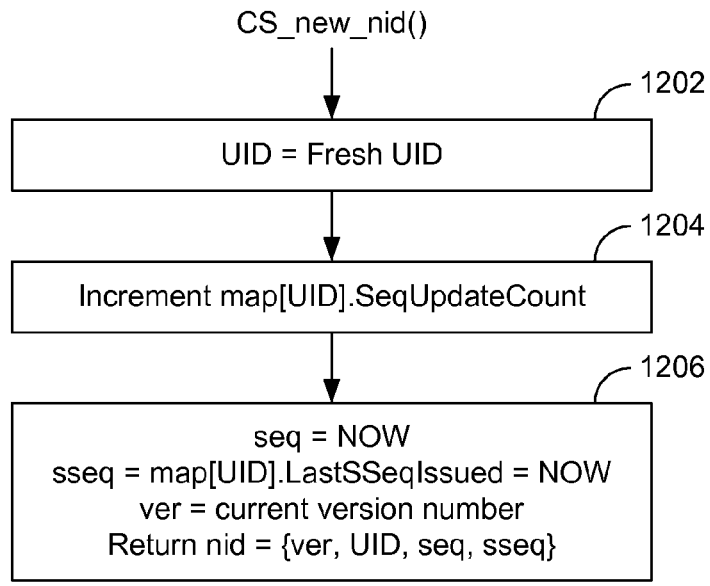
FIGS. 12A to 12D are detailed flowcharts illustrating how the cookie server analyzes a first cookie from the client and performs remedial actions according to some embodiments of the invention.

FIG. 12A depicts how the cookie server 120 generates a new first cookie in response to a request from the front end server 108. The cookie server 120 first gets a new unused user identifier UID for the new first cookie (1202). This includes generating a new entry for the new user identifier UID in the UID database. Next, the cookie server 120 increments the field map[UID].SeqUpdateCount by one (1204), to indicate that an updated Seq value is being sent to the client. Finally, the cookie server 120 generates a new first cookie NID by setting the sequence number Seq to the cookie server's current system time NOW, the secure sequence number Sseq and map[UID].LastSseqIssued to the current system time NOW, and the encoding format Version to the current version number (1206). These operations initialize the UID record for the new UID and also generate a corresponding first cookie. The current system time NOW is encoded using a predefined level of granularity, such as one to twenty minutes, and is time shifted to a current epoch (e.g., NOW may be set equal to the integer number of whole 10 minute periods since 0:00:00 Jan. 1, 1970).

Figure 12B:
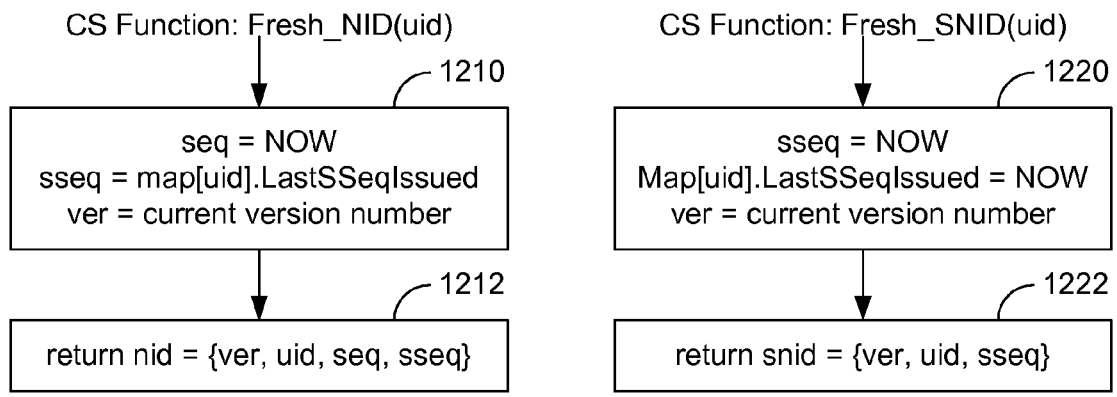

FIG. 12B has two flowcharts depicting how the cookie server 120 generates the first cookie Fresh_NID(UID) and the second cookie Fresh_SNID(UID) for a given user identifier UID. An updated first cookie is generated by setting Seq to the current system time NOW, setting Sseq to the Sseq value used in the last second cookie issued for the same UID (map[UID].LastSSeqIssued), ver to the current version number for the first cookie format (1210), and then generating a first cookie using these values (1212). An updated second cookie is generated by setting SSeq to the current system time NOW, storing the updated Sseq value in the UID record (map[UID].LastSSeqIssued), setting ver to the current version number for the second cookie format (1220), and then generating a second cookie using these values (1222).

Figure 12C:
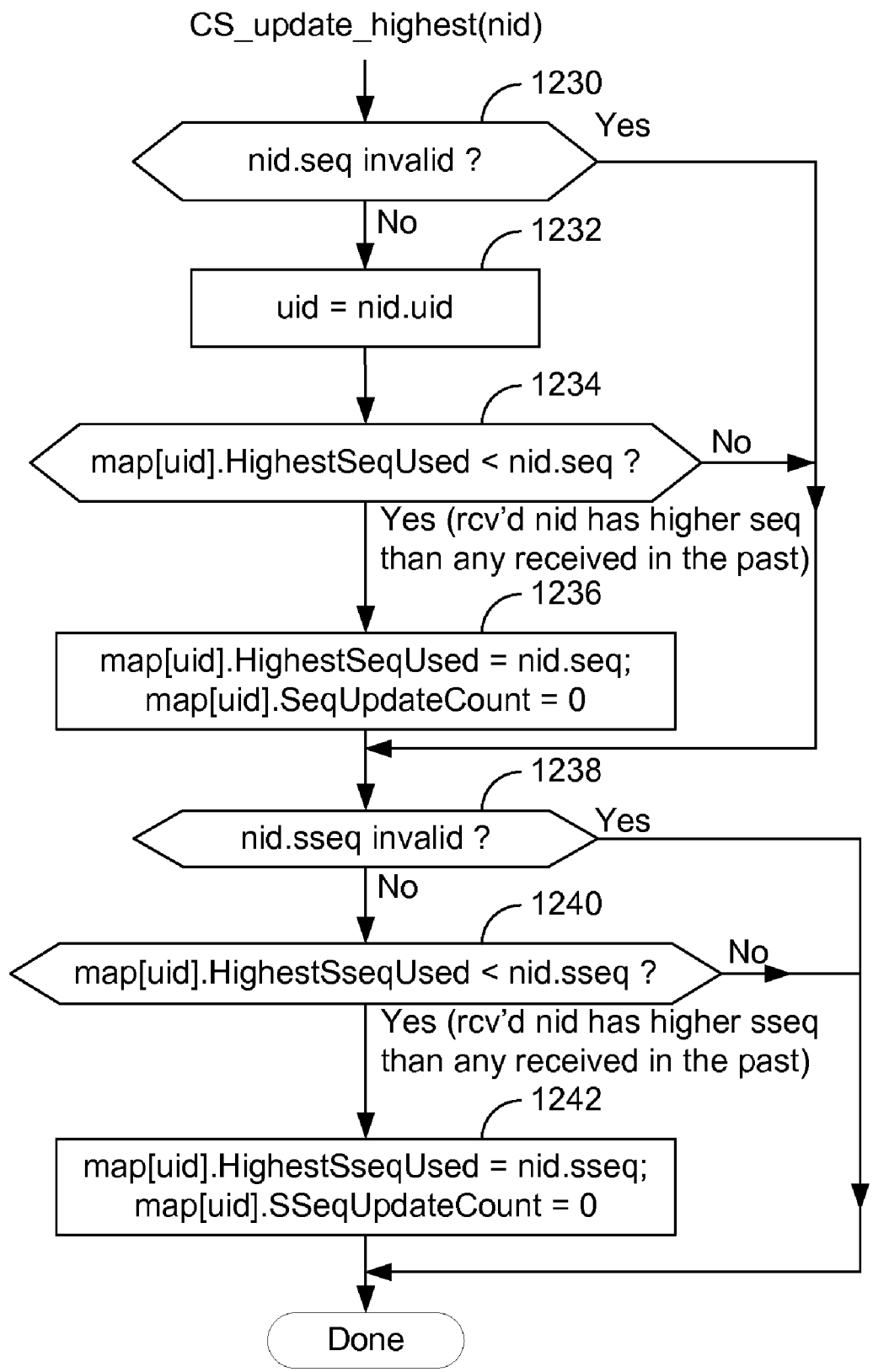

FIG. 12C is a flowchart illustrating how the cookie server 120 updates its database record identified by map[UID] in the UID database 103 using the first cookie NID. This procedure is referenced as CS_update_highest(nid) in FIGS. 12D and 13A. As noted above, map[UID].HighestSeqUsed and map[UID].HighestSseqUsed refer to the highest numbers ever presented by a client 102 for the user identifier UID. These two fields are used to detect when an identity infiltrator attempts to use an illegally obtained first cookie. Therefore, whenever the front end server 108 or the cookie server 120 encounters a new first cookie, it should perform a database record update after verifying that the first cookie is valid and well formed.

In particular, the cookie server 120 first checks if the sequence number NID.Seq and NID.Sseq are valid (1230, 1238). If NID.Seq is valid (1230-No), the cookie server 120 then checks if the UID database record needs to be updated (1232, 1234). If so (1234-Yes), the cookie server 120 sets the field map[UID].HighestSeqUsed to NID.Seq and resets the field map[UID].SeqUpdateCount to zero (1236). Similarly, if NID.Sseq is valid, the cookie server 120 then checks if the corresponding portion of the UID database record needs to be updated (1240). If so, the cookie server 120 sets the field map[UID].HighestSseqUsed to NID.Sseq, and resets the field map[UID].SseqUpdateCount to zero (1242).

Figure 12D:
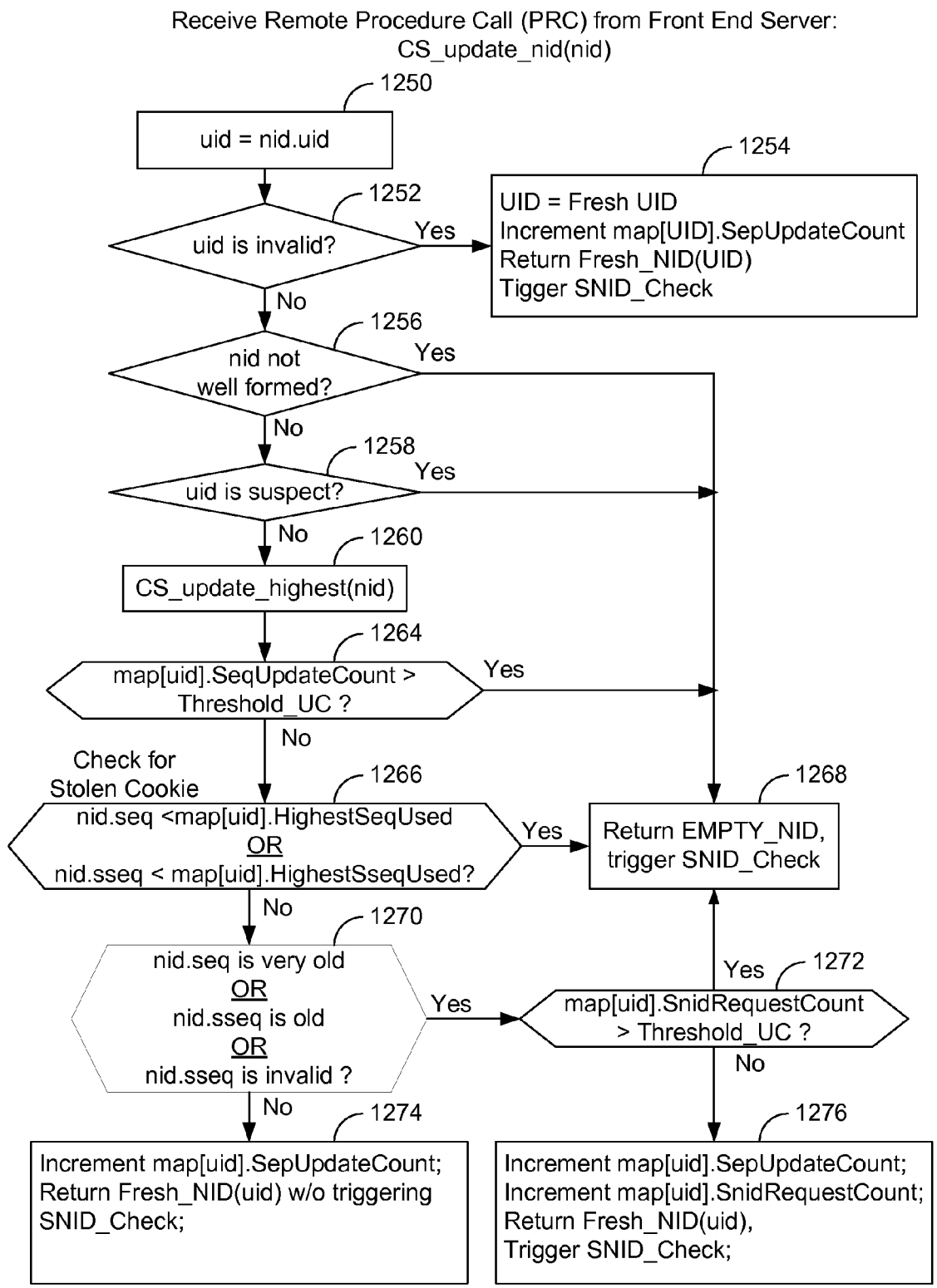

FIG. 12D is a flowchart of a procedure, CS_update_nid (nid), illustrating how the cookie server 120 updates the first cookie NID and triggers a check for the second cookie SNID, if necessary. This procedure, executed by the cookie server, is called by the front end server. The cookie server 120 first extracts the user identifier UID from the first cookie NID (1250) and then checks if the user identifier UID is valid (1252). As will be described below in connection with FIG. 13B, a user identifier is deemed invalid (i.e., map[uid]. Valid=false, or the corresponding UID record is not present in the UID database) if the cookie server 120 receives a second cookie whose secure sequence number Sseq is less than the field map[uid].HighestSseqUsed. In some embodiments, this condition may indicate that the second cookie has been obtained illegally from its original owner.

If the user identifier UID is invalid (1252, yes), the cookie server 120 issues a new unused user identifier UID, increments map[UID].SepUpdateCount by one, and returns a new first cookie NID to the client 102 through the front end server 108 (1254). In addition, the cookie server 120 also triggers the client 102 to perform a check of its second cookie SNID, if any. This is necessary because the client 102 does not have a second cookie that has the new user identifier UID, since the new one is just issued by the cookie server 120. The check of the second cookie SNID forces the client 102 to replace its invalid second cookie with a new one including the new user identifier UID.

If the user identifier UID is valid (1252, no), the cookie server 120 then checks if the first cookie NID is not well formed (1256) and whether the user identifier UID is suspect (1258). A failure of either test (1256, yes or 1258, yes) prompts the cookie server 120 to lose its confidence in the first cookie NID and to return a default first cookie EMPTY_NID as well as requesting a check of the second cookie SNID (1268). If the first cookie NID passes both tests (1256, no and 1258, no), the cookie server 120 then uses the first cookie NID to update its associated database record identified by map [NID.UID] (1260) to keep the database record in sync with the first cookie NID.

Next, the cookie server 120 checks if the field map[UID].SeqUpdateCount is greater than a predefined threshold count (1264). This could happen if the client 102 repeatedly refuses the new first cookies generated by the cookie server 120 (i.e., fails to replace an old or illegally obtained first cookie with any of the new first cookies). It also prompts the cookie server 120 to lose its confidence in the first cookie NID and to return the default first cookie as well as requesting a check of the second cookie SNID (1268).

If the field map[UID].SeqUpdateCount is less than the predefined threshold count (1264, no), the cookie server 120 checks if either the sequence number NID.Seq is less than map[UID].SeqHighestUsed or the secure sequence number NID.Sseq is less than map[UID].SseqHighestUsed (1266). In some embodiments, one client may submit multiple requests within a short time interval (e.g., a fraction of a second). A tolerance threshold is added to map[UID].SeqHighestUsed and/or map[UID].SseqHighestUsed at operation 1266 to achieve a reliable result. A failure by either one (1266, yes) causes the cookie server 120 to return the default first cookie EMPTY_NID and request a check of the second cookie SNID (1268). It is noted that a failure of either of the tests in 1266 is indicative of an illegally obtained first cookie. However, a system restore operation at the client, which restores old files including old cookies from a backup media, may also cause the tests in 1266 to fail.

Otherwise (1266, no), the cookie server 120 checks if the sequence number NID.Seq is very old or the secure sequence number NID.Sseq is old or invalid (1270). In some embodiments, different sequence numbers have different lifespans. For example, in one embodiment, the sequence number NID. Seq is deemed "old" if it lags at least fifteen minutes behind the cookie server 120's current system time. It is deemed "very old" if it lags at least a month behind the cookie server 120's current system time. In contrast, the secure sequence number NID.Sseq is deemed "old" if it lags, e.g., about an hour, behind the cookie server 120's current system time and "very old" if it lags, e.g., about three months, behind the cookie server 120's current system time. In some embodiments, the keys used to encrypt first cookies are "rolled over" (i.e., replaced with new keys) at predefined intervals (e.g., once per month). In these embodiments, the NID.Seq is also deemed to be old if the NID was encrypted with a key that has since expired. In any of these embodiments, if the sequence number NID.Seq is found to be old, the cookie server 120 generates an updated first cookie NID with an updated sequence number (1272). But this operation need not trigger an update of the second cookie SNID since the secure sequence number Sseq usually has a longer lifespan.

A satisfaction of any of the three conditions (1270, yes) prompts the cookie server 120 to replace the current first cookie NID by a new one with the same user identifier UID and cause the client 102 to submit a check for its second cookie SNID (1276). But before the replacement, the cookie server 120 checks if the client 102 has refused to submit the check for its second cookie SNID for a predefined number of times (1272). This situation may happen if the client 102's web browser fails multiple times to act upon an executable reference embedded in the response by the front end server 108. In this case (1272, yes), the cookie server 120 returns the default first cookie EMPTY_NID and still requests a check of the second cookie SNID (1268). This at least prevents the client 102 from accessing any personal information associated with the first cookie NID. In another embodiment, when the SnidRequestCount test (1272) is failed, the UID of the received first cookie is invalidated, thereby preventing further use of that UID.

If the first cookie NID does not meet any of the three conditions (1270, no), it is probably a reliable first cookie with an old (but not very old) sequence number Seq. In this case, the cookie server 120 updates the first cookie NID with a new sequence number Seq and returns the updated first cookie to the client 102 without requiring a further check of the second cookie associated with the client 102 (1274).

If the first cookie NID meets one of the three conditions (1270, yes) but the field map[UID].SnidRequestCount is less than the predefined number of times (1272, no), the cookie server 120 increments the field map[UID].SnidRequestCount by one, increments the field map[UID].SeqRequestCount by one, returns the resulting updated first cookie, and also triggers a check of the client's second cookie SNID (1276).

In sum, the cookie server 120 returns an updated first cookie to the client 102 and also triggers the client 102 to submit its second cookie SNID, if any, to the cookie server 120 under several conditions. The cookie server 120 then checks the status of the second cookie SNID and performs remedial actions accordingly, including updating both the first cookie and the second cookie SNID, if necessary.

Figure 13A:
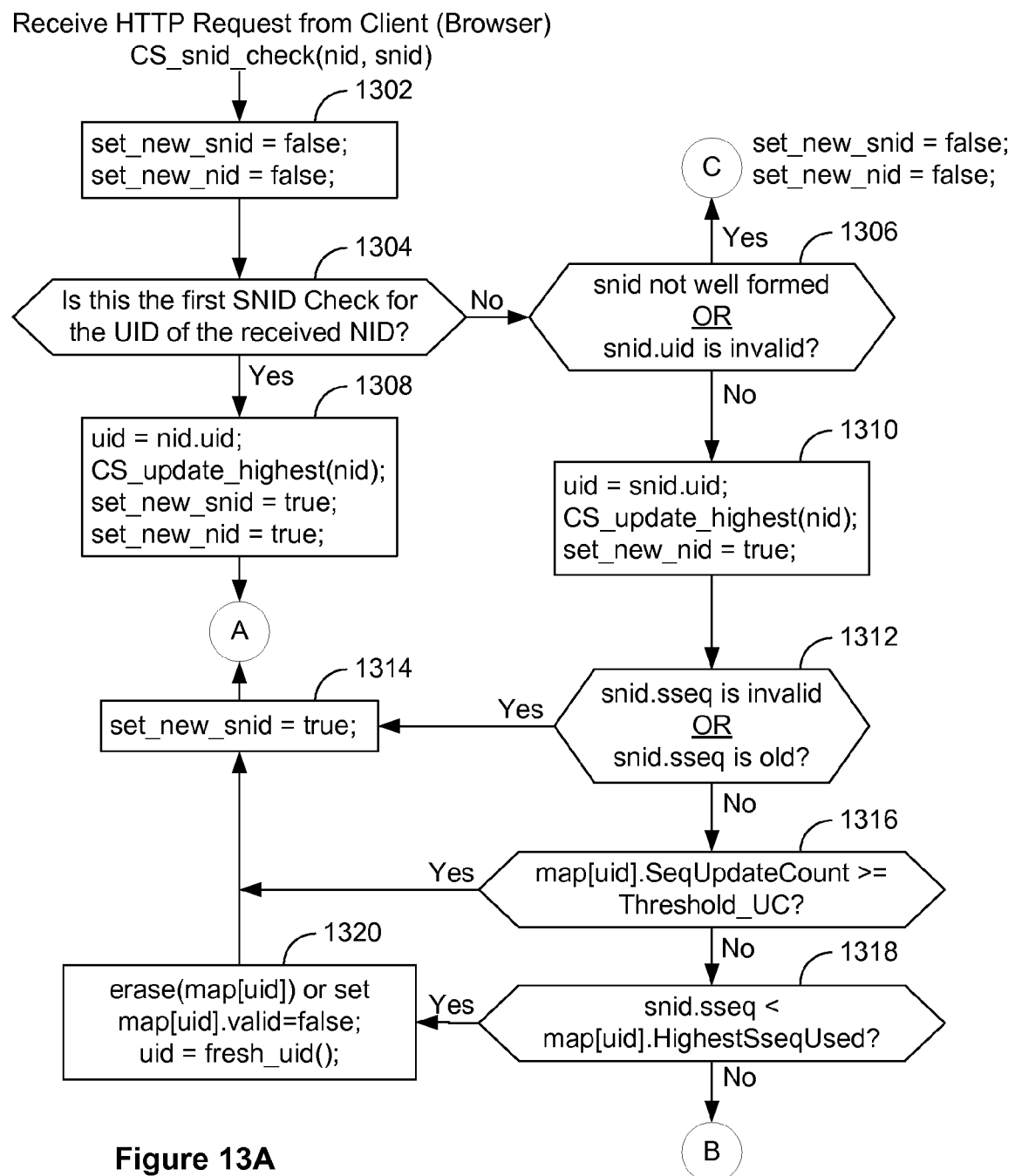
FIGS. 13A to 13C are detailed flowcharts illustrating how the cookie server analyzes a first cookie NID and a second cookie SNID received from a client and performs remedial actions according to some embodiments of the invention.
Figure 13B:
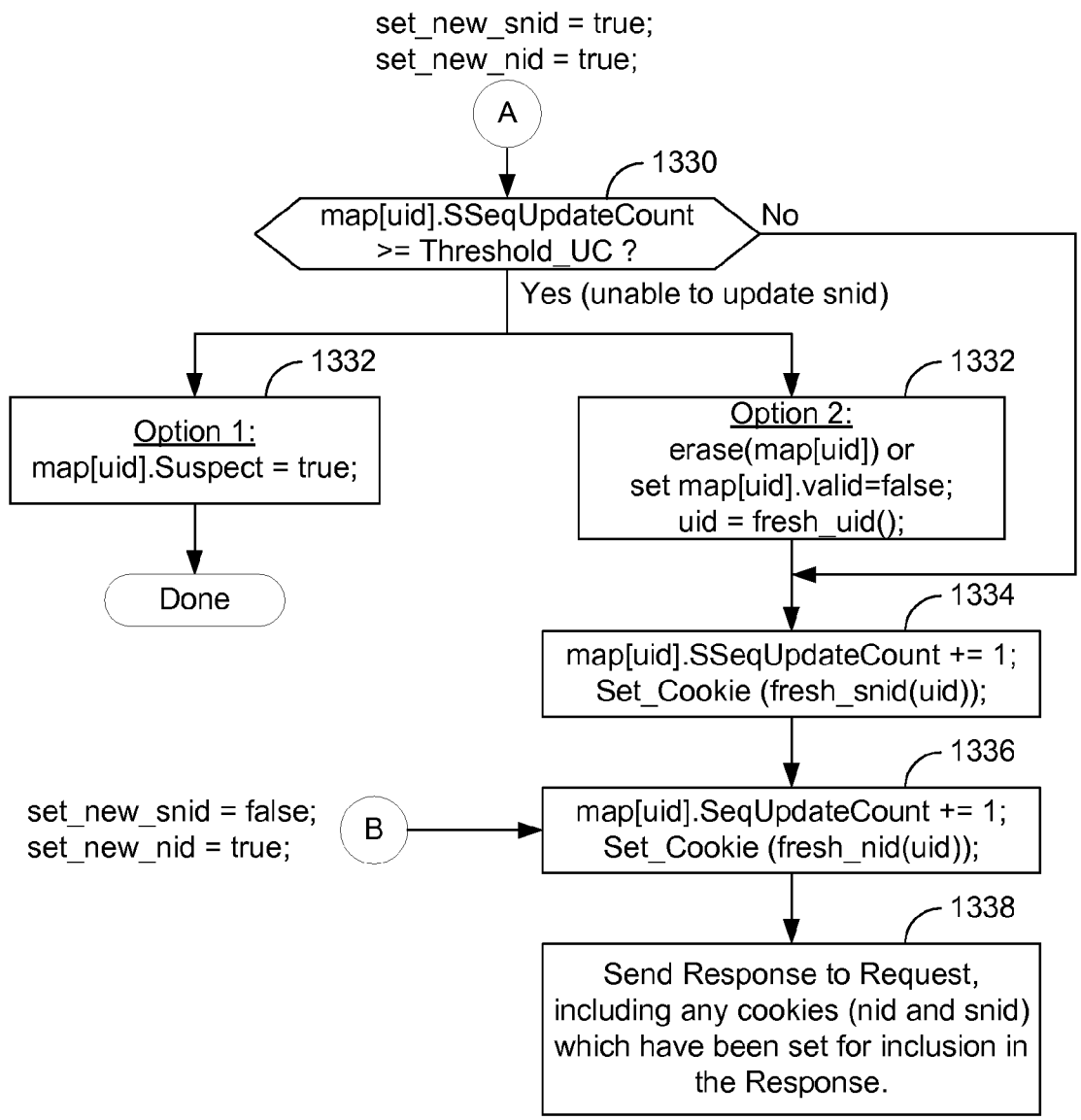
Figure 13C:
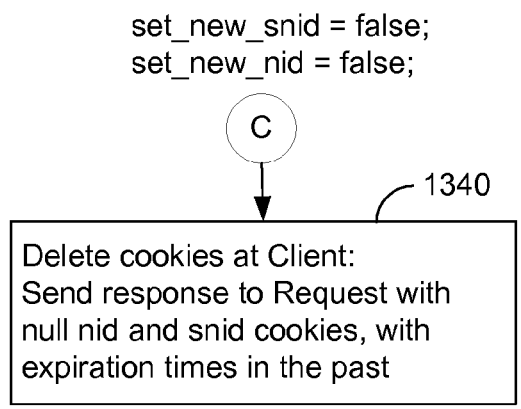

FIGS. 13A to 13C are flowcharts illustrating in detail how the cookie server 120 analyzes the first cookie NID and the second cookie SNID received from the client 102 and performs remedial actions according to some embodiments of the invention.

Until analysis of the cookies proves otherwise, the cookie server 120 assumes that neither of the first and second cookies requires updating (1302), and sets both set_new_nid and set_new_snid to false. Next, the cookie server 120 checks if this is the first check on a cookie having the user identifier NID.UID (1304). This is possible if this SNID check follows a first-ever request by the client 102 to the front end server 108 and the client 102 therefore has no second cookie. If so, the cookie server 120 reverses its default decision by updating both the first cookie NID (set_new_nid=true) and the second cookie (set_new_snid=true) (1308).

If this is not the first check on the user identifier NID.UID (1304, no), the cookie server 120 then checks if the second cookie SNID is not well formed or its user identifier SNID.UID is invalid (1306). If either is true, the cookie server 120 retains its default decision of not updating either cookie. In this case, the decision not to update the cookies indicates that the cookie server 120 has no confidence in the user identifier associated with the two cookies. As shown in FIG. 13C, the next operation by the cookie server 120 is to send a response that attempts to delete both cookies from the client 120 (1340). This may be achieved by sending two null cookies EMPTY_NID and EMPTY_SNID to the client 102 with expiration times set to be the past. If the client's browser application is operating properly, the first and second cookies stored by the client 102 will be replaced by the two null cookies, which in turn will be deleted from the client's cookie cache because they have expired.

If the second cookie SNID is well formed and valid (1306, no), the cookie server 120 at least partially reverses its default decision by updating the first cookie NID (set_new_nid=true) (1310). Additionally, the cookie server 120 also updates the database record identified by the user identifier NID.UID, by calling the CS_update_highest(nid) procedure. Next, the cookie server 120 checks if the second cookie SNID has an invalid or old secure sequence number Sseq (1312). If either condition is true (1312, yes), the cookie server 120 completely reverses its default decision by also updating the second cookie SNID (1314).

Otherwise (1312, no), the cookie server 120 checks whether the field map[SNID.UID].SeqUpdateCount is at least equal to a predefined threshold value (1316). As noted above, this happens when the client 102 refuses multiple times to accept the new first cookies generated by the cookie server 120. If so (1316, yes), the cookie server 120 loses its confidence in both the first cookie NID and the second cookie SNID, which means that both cookies need to be updated (1314, set_new_snid is set to true).

Otherwise (1316, no), the cookie server 120 checks if the secure sequence number SNID.Sseq is less than the updated field map[SNID.UID].SseqHighestUsed (1318). If this is true (1318, yes), the second cookie SNID is likely to be an illegally obtained cookie. For security reasons, the cookie server 120 marks the current user identifier SNID.UID as invalid (or, alternately, deletes the UID database record for the UID in the second cookie) and uses a new unused user identifier to generate new cookies (1320). If not (1318, no), the cookie server 120 transitions to operation 1336 (described below), with set_new_nid=true and set_new_snid=false, i.e., with the procedure configured to update the first cookie and to leave the second cookie intact.

As shown in FIG. 13B, if the cookie server 120 decides to update both the first and second cookies, it first checks if the field map[UID].SseqUpdateCount is at least equal to a predefined threshold (1330). The cookie server 120 uses this field to detect suspicious clients 102, e.g., clients using an illegally obtained second cookie. If the client 102 repeatedly refuses to update its second cookie (1330, true), the cookie server 120 has two options. In some embodiments, the cookie server 120 may mark the corresponding user identifier UID as "suspect." Once a UID has been marked as suspect, whenever the cookie server 120 receives any first cookie NID having the same user identifier, it merely ignores its existence and the client 102 is always served with generic responses. Alternatively, the cookie server 120 may mark the user identifier UID as "invalid" (or alternately, it may delete the corresponding UID record from the UID database) and then uses a new unused user identifier to generate new cookies (1332). The cookie server 120 first generates a new second cookie SNID (1334) and then a new first cookie NID (1336). Note that this specific order matters since the field map[UID].LastSseqIssued is set when the second cookie SNID is generated and used when the first cookie NID is generated. Finally, the cookie server 120 generates a response including the two newly generated cookies and returns the response to the client 102 (1338).

If the cookie server 120 only reverses half of its default decision, i.e., updating the first cookie and leaving the second cookie intact, the cookie server 120 bypasses some of the operations shown in FIG. 13B and starts with the operation of generating the first cookie NID (1336).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of processing requests from clients, comprising:

at one or more servers:

receiving requests from clients and sending responses, at least a subset of the responses including cookies produced by the one or more servers; at least a subset of the received requests including cookies that were previously produced by the one or more servers and sent to the clients with responses to previously processed requests; each of the cookies including a respective user identifier;

analyzing the received cookies, comprising cookies included in the received requests from the clients, to detect a first condition, wherein the first condition indicates that a respective plurality of distinct clients may be using cookies that have a same shared user identifier;

upon detecting the first condition, sending at least one of the clients of the respective plurality of distinct clients a response that includes a new cookie having a user identifier that is distinct from the shared user identifier;

analyzing the received cookies to detect a second condition, the second condition indicating that a respective client has repeatedly failed for a predetermined number of times to replace an old cookie with a new cookie sent by any of the one or more servers to the client; and upon detecting the second condition, performing a first predefined remedial action;

wherein the received cookies comprise first cookies and the received requests comprise first requests; and wherein performing the predefined remedial action includes sending the respective client a response that includes an executable reference, wherein the executable reference is configured so that execution of the executable reference by the respective client would send a second request with a second cookie distinct from the first cookies from the respective client to a respective server.

2. The method of claim 1, further comprising upon receipt of the second request with the second cookie, analyzing the second cookie to detect a third condition; and upon detecting the third condition, performing a second predefined remedial action.

3. The method of claim 2, wherein performing the second predefined remedial action includes replacing the first and second cookies at the respective client with new first and second cookies.

4. The method of claim 2, wherein performing the second predefined remedial action includes deleting the first and second cookies at the respective client.

5. The method of claim 2, wherein performing the second predefined remedial action includes replacing the second cookie at the respective client.

6. A method of processing requests from clients, comprising:

at one or more servers:

receiving requests from clients and sending responses, at least a subset of the responses including cookies produced by the one or more servers; at least a subset of the received requests including cookies that were previously produced by the one or more servers and sent to the clients with responses to previously processed requests; each of the cookies including a respective user identifier;

analyzing the received cookies, comprising cookies included in the received requests from the clients, to detect a first condition, wherein the first condition indicates that a respective plurality of distinct clients may be using cookies that have a same shared user identifier;

upon detecting the first condition, sending at least one of the clients of the respective plurality of distinct clients a response that includes a new cookie having a user identifier that is distinct from the shared user identifier;

analyzing the received cookies to detect a second condition, the second condition indicating that a respective client has repeatedly failed for a predetermined number of times to replace an old cookie with a new cookie sent by any of the one or more servers to the client; and upon detecting the second condition, performing a first predefined remedial action; wherein the received cookies comprise first cookies and the received requests comprise first requests; and performing the predefined remedial action includes sending the respective client a response that includes an executable reference, wherein the executable reference is configured so that execution of the executable reference by the respective client would send a second request to a respective server;

upon receipt of the second request, determining whether the second request includes a second cookie, wherein the second cookie is distinct from a corresponding first cookie, and when the second request does not include the second cookie, sending a response to the second request to cause a respective first cookie to be deleted from the respective client.

7. A method of processing requests from clients, comprising:

at one or more servers associated with a first domain:

receiving first requests from clients and sending first responses, at least a subset of the first responses including first cookies produced by the one or more servers; at least a subset of the received first requests including first cookies that were previously produced by the one or more servers and sent to the clients with responses to previously processed first requests; each of the first cookies including a respective user identifier;

at a server associated with a sub-domain of the first domain, receiving second requests from the clients and sending second responses; at least a subset of the second requests including second cookies distinct from the first cookies;

analyzing the received second requests to detect a first condition, wherein the first condition indicates that a respective client is using a respective first cookie that belongs to a second client;

upon detecting the first condition, performing a predefined remedial action, further including:

evaluating the first cookies to determine whether a respective first cookie violates a predefined requirement, the respective first cookie corresponding to a respective first request, and when the respective first cookie is determined to violate the predefined requirement, sending to the respective client a response to the respective first request, wherein the response includes an executable reference, wherein the executable reference is configured so that execution of the executable reference by the respective client would send a respective second request with a second cookie from the respective client to the server associated with the sub-domain of the first domain.

8. A system for processing requests from clients, comprising:

memory;

one or more processors; and one or more programs stored in the memory and executed by the one or more processors, the one or more programs including:

instructions for receiving requests from clients and sending responses, at least a subset of the responses including cookies produced by the system; at least a subset of the received requests including cookies that were previously produced by the system and sent to the clients with responses to previously processed requests; each of the cookies including a respective user identifier;

instructions for analyzing the received cookies, comprising cookies included in the received requests from the clients, to detect a first condition, wherein the first condition indicates that a respective plurality of distinct clients may be using cookies that have a same shared user identifier;

instructions, for execution when the first condition is detected, for sending at least one of the clients of the respective plurality of distinct clients a response that includes a new cookie having a user identifier that is distinct from the shared user identifier;

instructions for analyzing the received cookies to detect a second condition, the second condition indicating that a respective client has repeatedly failed for a predetermined number of times to replace an old cookie with a new cookie sent by any of the one or more servers to the client; and instructions, for execution when second condition is detected, for performing a first predefined remedial action; wherein the received cookies comprise first cookies and the received requests comprise first requests; and the instructions for performing the first predefined remedial action include instructions for sending the respective client a response that includes an executable reference, wherein the executable reference is configured so that execution of the executable reference by the respective client would send a second request with a second cookie distinct from the first cookies from the respective client to a respective server.

9. The system of claim 8, the at least one program further including:

instructions, for execution upon receipt of the second request with the second cookie, for analyzing the second cookie to detect a third condition;

instructions, for execution when the third condition is detected, for performing a second predefined remedial action.

10. The system of claim 9, wherein the instructions for performing the second predefined remedial action include instructions for replacing the first and second cookies at the respective client with new first and second cookies.

11. The system of claim 9, wherein the instructions for performing the second predefined remedial action include instructions for deleting the first and second cookies at the respective client.

12. The system of claim 9, wherein the instructions for performing the second predefined remedial action include instructions for replacing the second cookie at the respective client.

13. A system for processing requests from clients, comprising:

memory;

one or more processors; and one or more programs stored in the memory and executed by the one or more processors, the one or more programs including:

instructions for receiving requests from clients and sending responses, at least a subset of the responses including cookies produced by the system; at least a subset of the received requests including cookies that were previously produced by the system and sent to the clients with responses to previously processed requests; each of the cookies including a respective user identifier;

instructions for analyzing the received cookies, comprising cookies included in the received requests from the clients, to detect a first condition, wherein the first condition indicates that a respective plurality of distinct clients may be using cookies that have a same shared user identifier;

instructions, for execution when the first condition is detected, for sending at least one of the clients of the respective plurality of distinct clients a response that includes a new cookie having a user identifier that is distinct from the shared user identifier;

instructions for analyzing the received cookies to detect a second condition, the second condition indicating that a respective client has repeatedly failed for a predetermined number of times to replace an old cookie with a new cookie sent by any of the one or more servers to the client; and instructions, for execution when second condition is detected, for performing a first predefined remedial action; wherein the received cookies comprise first cookies and the received requests comprise first requests; and the instructions for performing the predefined remedial action include instructions for sending the respective client a response that includes an executable reference, wherein the executable reference is configured so that execution of the executable reference by the respective client would send a second request to a respective server;

the at least one program further including:

instructions, for execution upon receipt of the second request, for determining whether the second request includes a second cookie, wherein the second cookie is distinct from a corresponding first cookie, and instructions, for execution when the second request does not include the second cookie, for sending a response to the second request to cause a respective first cookie to be deleted from the respective client.

14. A system for processing requests from clients, comprising:

memory;

one or more processors; and one or more programs stored in the memory and executed by the one or more processors, the one or more programs including:

instructions for receiving, at one or more processors associated with a first domain, first requests from clients and sending first responses, at least a subset of the first responses including first cookies produced by the one or more servers; at least a subset of the received first requests including first cookies that were previously produced by the one or more servers and sent to the clients with responses to previously processed first requests; each of the first cookies including a respective user identifier;

instructions for receiving, at one or more processors associated with a sub-domain of the first domain, second requests from the clients and sending second responses; at least a subset of the second requests including second cookies distinct from the first cookies;

instructions for analyzing the received second requests to detect a first condition, wherein the first condition indicates that a respective client is using a respective first cookie that belongs to a second client;

instructions, for execution when the first condition is detected, for performing a predefined remedial action;

wherein the one or more programs further include:

instructions for evaluating the first cookies to determine whether a respective first cookie violates a predefined requirement, the respective first cookie corresponding to a respective first request, and when the respective first cookie is determined to violate the predefined requirement, sending to the respective client a response to the respective first request, wherein the response includes an executable reference, wherein the executable reference is configured so that execution of the executable reference by the respective client would send a respective second request with a second cookie from the respective client to the server associated with the sub-domain of the first domain.

* * * * *